US012617422B2

(12) United States Patent
Wang et al.

(10) Patent No.: US 12,617,422 B2
(45) Date of Patent: May 5, 2026

(54) SYSTEMS, METHODS, AND NON-TRANSITORY COMPUTER-READABLE MEDIUM FOR PRIORITIZING A PLURALITY OF MANEUVER MESSAGES

(71) Applicant: Toyota Motor Engineering & Manufacturing North America, Inc., Plano, TX (US)

(72) Inventors: Hao M. Wang, Mountain View, CA (US); Sergei S. Avedisov, Mountain View, CA (US); Yashar Zeiynali Farid, Mountain View, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 167 days.

(21) Appl. No.: 18/105,354

(22) Filed: Feb. 3, 2023

(65) Prior Publication Data

US 2024/0262381 A1     Aug. 8, 2024

(51) Int. Cl.
*B60W 60/00*          (2020.01)

(52) U.S. Cl.
CPC ....... *B60W 60/001* (2020.02); *B60W 2552/53* (2020.02); *B60W 2554/4041* (2020.02); *B60W 2554/4045* (2020.02)

(58) Field of Classification Search
CPC .......... B60W 60/001; B60W 2552/53; B60W 2554/4041; B60W 2554/4045
See application file for complete search history.

(56) References Cited

U.S. PATENT DOCUMENTS

| | | | |
|---|---|---|---|
| 9,978,284 | B2 | 5/2018 | Riedelsheimer et al. |
| 2017/0330461 | A1* | 11/2017 | Caveney ................ G08G 1/161 |
| 2018/0322782 | A1* | 11/2018 | Engel ..................... G08G 1/163 |
| 2020/0114920 | A1 | 4/2020 | Zhang et al. |
| 2021/0360373 | A1 | 11/2021 | Yang et al. |
| 2023/0131851 | A1* | 4/2023 | Yu ......................... G01S 13/931 |
| | | | 701/301 |

FOREIGN PATENT DOCUMENTS

| | | |
|---|---|---|
| WO | 2021012145 A1 | 1/2021 |
| WO | 2021203372 A1 | 10/2021 |

OTHER PUBLICATIONS

Alejandro Correa et al., "On the Impact of V2X-based Maneuver Coordination on the Traffic", 2021, pp. 1-5, 2021 IEEE 93rd Vehicular Technology Conference (VTC2021—Spring).

* cited by examiner

*Primary Examiner* — Abby J Flynn
*Assistant Examiner* — Paulo Roberto Gonzalez Leite
(74) *Attorney, Agent, or Firm* — DINSMORE & SHOHL LLP

(57)          ABSTRACT

An ego vehicle includes a controller configured to receive a plurality of maneuver messages from a plurality of connected vehicles. The maneuver messages include maneuvers to be performed by the plurality of connected vehicles. The controller determines degrees of criticality for the maneuvers, determines priorities of the plurality of maneuver messages based on the degrees of criticality for the maneuvers, and determines whether to accept one or more of the plurality of maneuver messages based on the determined priorities.

19 Claims, 20 Drawing Sheets

SYSTEMS, METHODS, AND NON-TRANSITORY COMPUTER-READABLE MEDIUM FOR PRIORITIZING A PLURALITY OF MANEUVER MESSAGES

TECHNICAL FIELD

The present disclosure relates to systems, methods, and non-transitory computer-readable mediums for prioritizing a plurality of maneuver messages.

BACKGROUND

Cooperative maneuvering may involve multiple connected vehicles simultaneously performing a task such as a cooperative merge, a lane change, or an unsignalized intersection crossing. These connected vehicles may use wireless communication, such as V2V communication, to come to an agreement. This agreement may be referred to as a maneuver message. The decentralized cooperative maneuver usually begins with the initiating connected vehicle sending a request for cooperation with an ego vehicle by means of a request maneuver message.

In an environment with multiple connected vehicles, an ego vehicle may receive requests to participate in two or more separate cooperative maneuvers from two or more separate connected vehicles. In that case, the ego vehicle may have several choices. First, the ego vehicle may cooperate with both initiating connected vehicles to satisfy both vehicles' requests. Second, the ego vehicle may select an initiating connected vehicle out of the requesting initiating connected vehicles to prioritize the requested cooperative maneuver and cooperate with the selected initiating connected vehicles. Other connected vehicles' requests get rejected. Third, the ego vehicle may reject all requested maneuvers. However, conventional systems, methods, and non-transitory computer-readable mediums including standardization bodies do not provide how to leverage multiple cooperative maneuvers.

Accordingly, a need exists for systems, methods, and non-transitory computer-readable mediums that prioritize a plurality of maneuver messages to provide effective implementation of agreement seeking cooperation using maneuver messages.

SUMMARY

The present disclosure provides systems, methods, and non-transitory computer-readable mediums for prioritizing a plurality of maneuver messages by determining degrees of criticality for maneuvers. With determination of degrees of criticality for maneuvers, the systems, methods, and non-transitory computer-readable mediums prioritize plurality of maneuver messages and provide effective implementation of agreement seeking cooperation using maneuver messages, thereby avoiding an undesirable situation.

In one or more embodiments, an ego vehicle includes a controller configured to receive a plurality of maneuver messages from a plurality of connected vehicles, the maneuver messages including maneuvers to be performed by the plurality of connected vehicles, determine degrees of criticality for the maneuvers, determine priorities of the plurality of maneuver messages based on the degrees of criticality for the maneuvers, and determine whether to accept one or more of the plurality of maneuver messages based on the determined priorities.

In another embodiment, a method for prioritizing a plurality of maneuver messages includes receiving a plurality of maneuver messages from a plurality of connected vehicles the maneuver messages including maneuvers to be performed by the plurality of connected vehicles, determining degrees of criticality for the maneuvers, determining priorities of the plurality of maneuver messages based on the degrees of criticality for the maneuvers, and determining whether to accept one or more of the plurality of maneuver messages based on the determined priorities.

In yet another embodiment, a non-transitory computer-readable medium for prioritizing a plurality of maneuver messages that, when executed by a controller, causes the controller to receive a plurality of maneuver messages from a plurality of connected vehicles the maneuver messages including maneuvers to be performed by the plurality of connected vehicles, determine degrees of criticality for the maneuvers, determine priorities of the plurality of maneuver messages based on the degrees of criticality for the maneuvers, and determine whether to accept one or more of the plurality of maneuver messages based on the determined priorities.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1A:
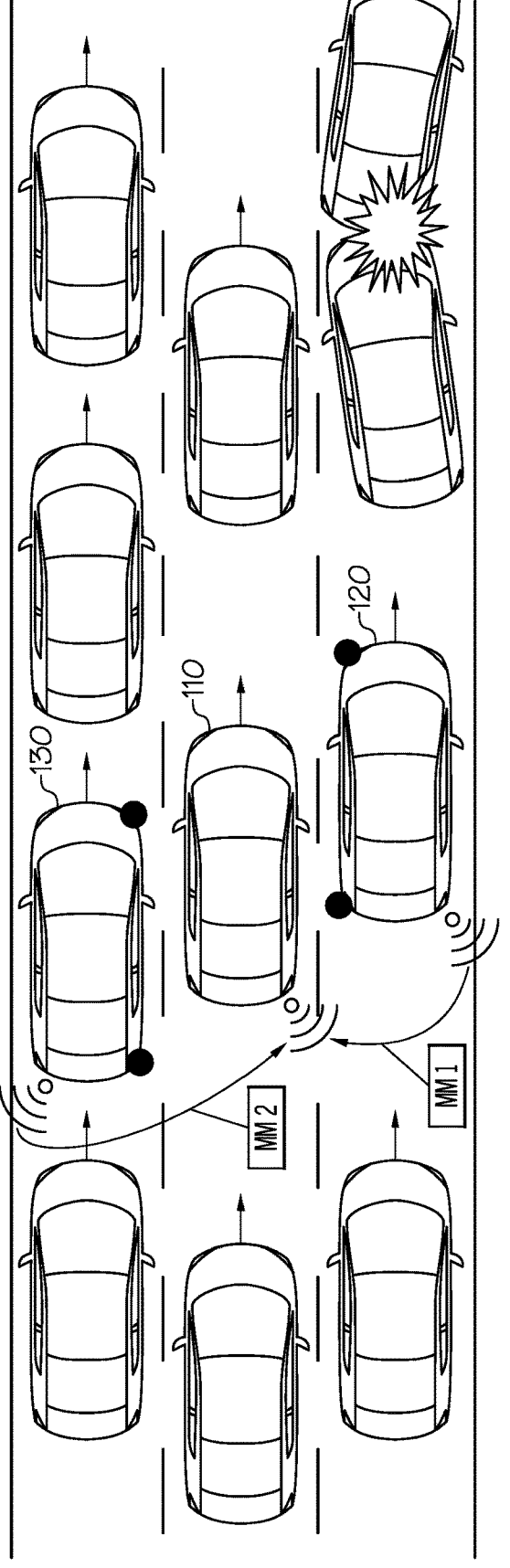
FIGS. 1A-1D schematically depict an exemplary embodiment of prioritizing a plurality of maneuver messages including lane exchanges on a three-lane highway, according to one or more embodiments shown and described herein.

The embodiments disclosed herein include systems, methods, and non-transitory computer-readable mediums for prioritizing a plurality of maneuver messages by determining degrees of criticality for maneuvers. With a determination of degrees of criticality for maneuvers, the systems, methods, and non-transitory computer-readable mediums prioritize a plurality of maneuver messages and provide effective implementation of agreement seeking cooperation using maneuver messages, thereby avoiding an undesirable situation. Further, the systems, methods, and non-transitory computer-readable mediums may accept more than one maneuver message while avoiding an undesirable situation.

As used herein, the term "Maneuver Message (MM)" may refer to a general class of wireless messages exchanged between road users and infrastructure that contains the future trajectory or possible future trajectories) of the transmitting road user. Specific examples of such messages could be the Maneuver Coordination Message (MCM) undergoing standardization by European Telecommunications Standards Institute (ETSI) or the Maneuver Sharing Coordination Message (MSCM) currently being standardized by Society of Automotive Engineers (SAE).

FIGS. 1A-1D schematically depict an exemplary embodiment of prioritizing a plurality of maneuver messages including lane exchanges on a three-lane highway, according to one or more embodiments shown and described herein.

Referring to FIGS. 1A-1D, the ego vehicle 110, the first connected vehicle 120, and the second connected vehicle 130 may be on a three-lane highway where there is an incident in the right lane on the three-lane highway. The ego vehicle 110 may be in the middle lane of the three-lane highway. The first connected vehicle 120 may be in the right lane of the three-lane highway. The second connected vehicle 130 may be in the left lane of the three-lane highway.

The ego vehicle 110, the first connected vehicle 120, the second connected vehicle 130, or combinations thereof, may be a vehicle including an automobile or any other passenger or non-passenger vehicle such as, for example, a terrestrial, aquatic, and/or airborne vehicle. In some embodiments, the ego vehicle 110, the first connected vehicle 120, the second connected vehicle 130, or combinations thereof, may be an autonomous driving vehicle. The ego vehicle 110, the first connected vehicle 120, the second connected vehicle 130, or combinations thereof, may be an autonomous vehicle that navigates its environment with limited human input or without human input. The ego vehicle 110, the first connected vehicle 120, the second connected vehicle 130, or combinations thereof, may be equipped with internet access and share data with other devices both inside and outside the ego vehicle 110, the first connected vehicle 120, the second connected vehicle 130, or combinations thereof. The ego vehicle 110, the first connected vehicle 120, the second connected vehicle 130, or combinations thereof may communicate with the server and transmit its data to the server. For example, the ego vehicle 110, the first connected vehicle 120, the second connected vehicle 130, or combinations thereof, transmits information about its current location and destination, its environment, information about a current driver, information about a task that it is currently implementing, and the like. The ego vehicle 110, the first connected vehicle 120, the second connected vehicle 130, or combinations thereof, may include an actuator configured to move the ego vehicle 110, the first connected vehicle 120, the second connected vehicle 130, or combinations thereof.

Referring to FIG. 1A, the first connected vehicle 120 may want to make a lane change from the right lane to the middle lane in front of the ego vehicle 110 to avoid the incident. The second connected vehicle 130 may want to make a lane change from the left lane to the middle lane in front of the ego vehicle 110 for convenience.

Figure 1B:
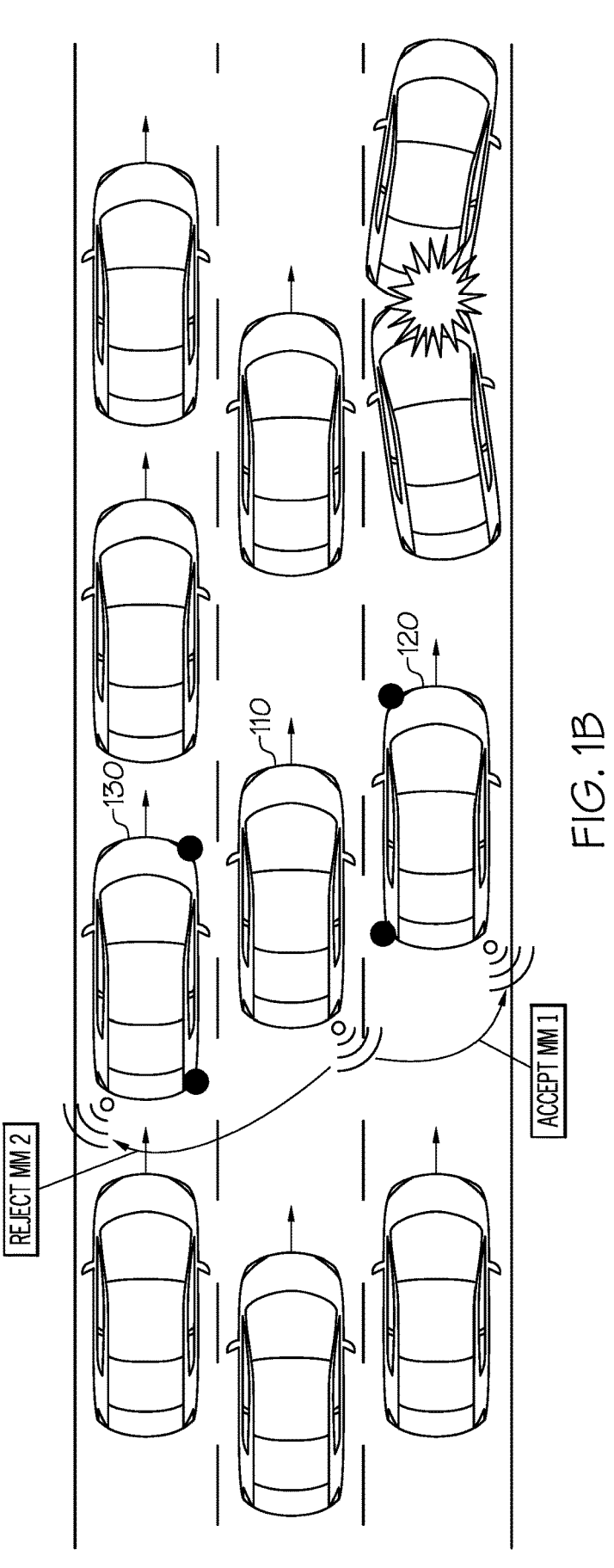

Referring to FIG. 1B, the ego vehicle 110 may receive a plurality of maneuver messages from a plurality of connected vehicles. The maneuver messages may include maneuvers to be performed by the plurality of connected vehicles. For example, the ego vehicle 110 may receive maneuver messages from the first connected vehicle 120 and the second connected vehicle 130. The ego vehicle 110 may receive the first maneuver message MM1 from the first connected vehicle 120 and the second maneuver message MM2 from the second connected vehicle 130. Each of maneuver messages may include maneuvers to be performed by the plurality of connected vehicles. For example, the first maneuver message MM1 from the first connected vehicle 120 may include a first maneuver related to the lane change from the right lane to the middle lane in front of the ego vehicle 110. The second maneuver message MM2 from the second connected vehicle 130 may include a second maneuver related to the lane change from the left lane to the middle lane in front of the ego vehicle 110.

In some embodiments, the ego vehicle 110 may set a predetermined time period of receiving maneuver messages. The ego vehicle 110 may stop receiving additional maneuver messages or shorten the predetermined time period of receiving maneuver messages in response to receiving an emergency maneuver message from one of the plurality of maneuver messages during the predetermined time period. In some embodiments, the emergency maneuver message may include a warning maneuver message from connected vehicles to warn a potential conflict or collision between the plurality of connected vehicles, the connected vehicle and unconnected vehicle, the connected vehicle and the ego vehicle 110, the ego vehicle 110 and unconnected vehicle, the plurality of unconnected vehicles, or combinations thereof. The ego vehicle 110 may determine that the emergency maneuver message has higher priority than no emergency maneuver messages. No emergency maneuver messages from connected vehicles do not include a warning maneuver message to warn a potential conflict or collision.

In some embodiments, the ego vehicle 110 may extend the predetermined time period for receiving maneuver messages in response to determining that no emergency maneuver message is received during the predetermined time period.

Still referring to FIGS. 1A and 1B, the ego vehicle 110 may determine degrees of criticality for the maneuvers. For example, after receiving the first maneuver message MM1 from the first connected vehicle 120 and the second maneuver message MM2 from the second connected vehicle 130, the ego vehicle 110 may evaluate the criticality for the maneuvers. The ego vehicle 110 may determine that the first maneuver includes a mandatory lane change in front of the ego vehicle 110 to avoid conflict or collision in the right lane. The ego vehicle 110 may determine that the second maneuver includes a discretionary lane change because the lane change of the second connected vehicle 130 in front of the ego vehicle 110 is not critical to avoid conflict or collision in the left lane.

The ego vehicle 110 may determine the priorities of the plurality of maneuver messages based on the degrees of criticality for the maneuvers. When the plurality of maneuver messages comprise a mandatory maneuver message and a discretionary maneuver message, the mandatory maneuver message may have higher priority than the discretionary maneuver message. For example, the first maneuver including a mandatory lane change in front of the ego vehicle 110 to avoid conflict or collision in the right lane from the first connected vehicle 120 may have higher priority than the second maneuver including a discretionary lane change in front of the ego vehicle 110 from the second connected vehicle 130.

The ego vehicle 110 may determine whether to accept one or more of the plurality of maneuver messages based on the determined priorities. In some embodiments, the ego vehicle 110 may accept one maneuver message and reject other maneuver messages. For example, due to the traffic scenario and the traffic density, the ego vehicle 110 may not accept all maneuver messages. For example, the ego vehicle 110 may accept the first maneuver message MM1 from the first connected vehicle 120 and reject the second maneuver message MM2 from the second connected vehicle 130.

Figure 1C:
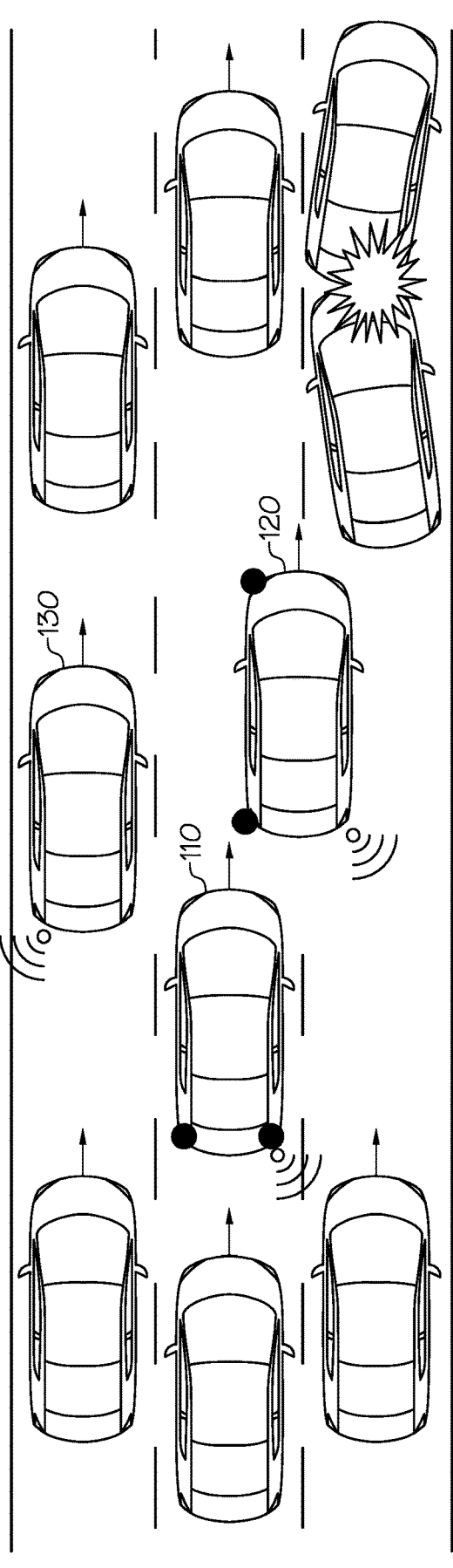
Figure 1D:
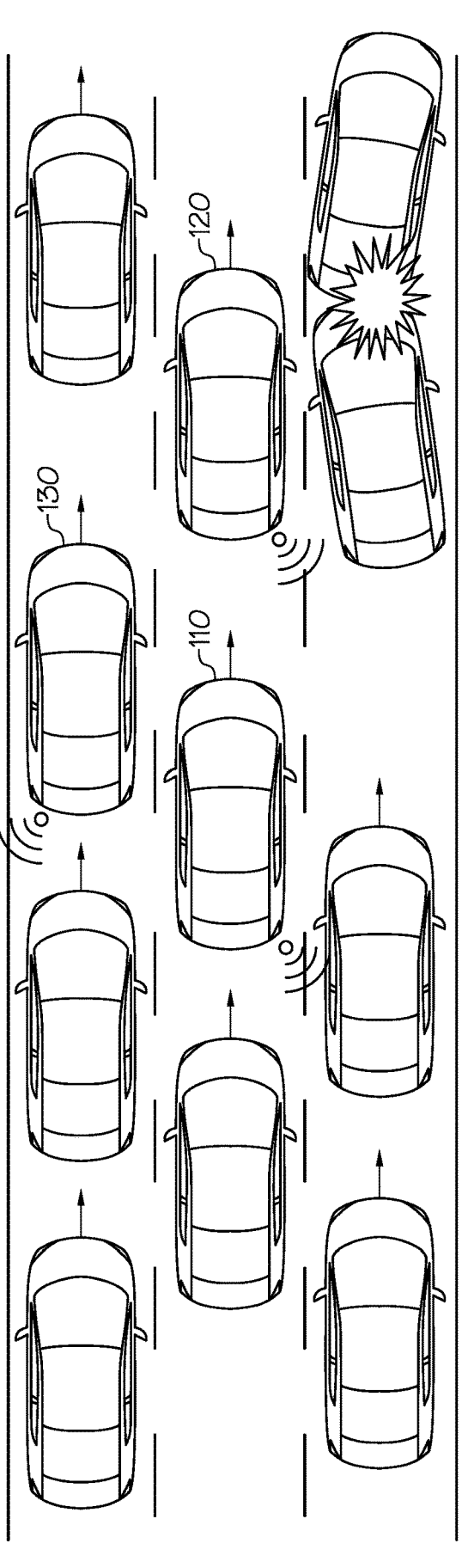

In some embodiments, the acceptance messages, the denial messages, or both include maneuver information about maneuvers to be performed by one or more of the plurality of connected vehicles. Referring to FIGS. 1C and 1D, the acceptance message, the denial message, or both, may include maneuver information about a lane change of the first connected vehicle 120 from the right lane to the middle lane in front of the ego vehicle 110.

The ego vehicle 110 may transmit acceptance messages, denial messages, or both to the plurality of connected vehicles. For example, the ego vehicle 110 may transmit an acceptance message to the first connected vehicle 120. The ego vehicle 110 may transmit a denial message to the second connected vehicle 130.

In embodiments, a display of an output device of the ego vehicle 110, a display of a device of the driver of the ego vehicle 110, a display of an output device of the first connected vehicle 120, a display of a device of the driver of the first connected vehicle 120, a display of an output device of the second connected vehicle 130, a display of a device of the driver of the second connected vehicle 130, combinations thereof, may display acceptance messages, denial messages, or both. In embodiments, the output device of the ego vehicle 110, the device of the driver of the ego vehicle 110, the output device of the first connected vehicle 120, the device of the driver of the first connected vehicle 120, the output device of the second connected vehicle 130, the device of the driver of the second connected vehicle 130, or combinations thereof, may include a smartphone, a smartwatch, a laptop, a tablet computer, a personal computer, and a wearable device, or combinations thereof.

In some embodiments, as shown in FIGS. 1C and 1D, after the ego vehicle 110 accepts the first maneuver message MM1 from the first connected vehicle 120 and rejects the second maneuver message MM2 from the second connected vehicle 130, the ego vehicle 110 and the first connected vehicle 120 may perform a cooperative maneuver, such as a lane change of the first connected vehicle 120 from the right lane to the middle lane. The second connected vehicle 130 may keep moving in the left lane without a lane change.

Figure 2:
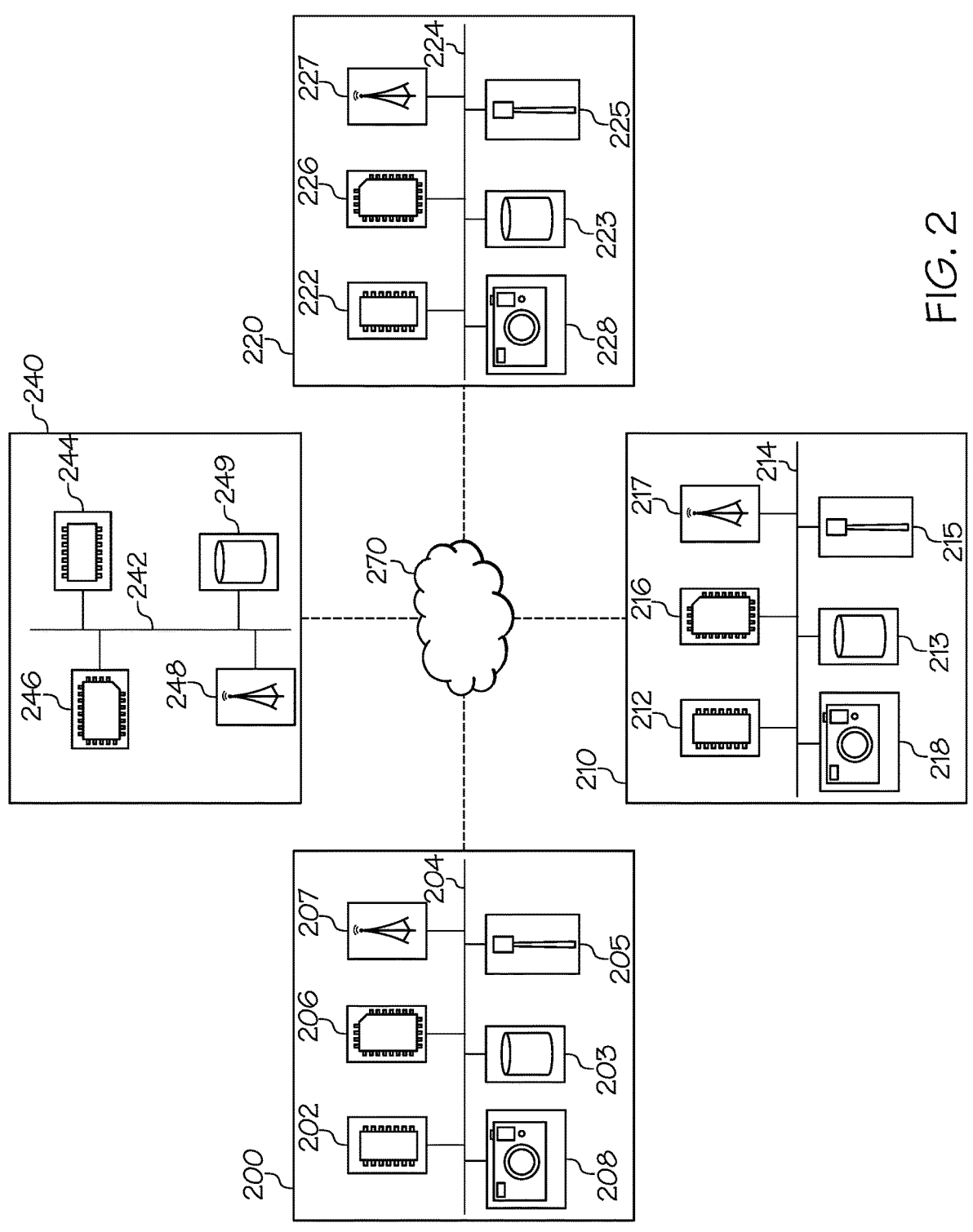
FIG. 2 depicts a schematic diagram of a system for prioritizing a plurality of maneuver messages, according to one or more embodiments shown and described herein.

FIG. 2 depicts a schematic diagram of a system for prioritizing a plurality of maneuver messages, according to one or more embodiments shown and described herein. The system includes an ego vehicle system 200, a first connected vehicle system 210, a second connected vehicle system 220, and a server 240.

It is noted that, while FIG. 2 depicts that the ego vehicle system 200 communicates with more than one connected vehicle system. Connected vehicle system may include first connected vehicle system 210 and second connected vehicle system 220. In embodiments, each of the ego vehicle system 200, the first connected vehicle system 210, and the second connected vehicle system 220 may be included within a vehicle that may be an automobile or any other passenger or non-passenger vehicle such as, for example, a terrestrial, aquatic, and/or airborne vehicle. In some embodiments, the vehicle may be an autonomous vehicle that navigates its environment with limited human input or without human input.

The ego vehicle system 200 includes one or more processors 202. Each of the one or more processors 202 may be any device capable of executing machine-readable and executable instructions. Each of the one or more processors 202 may be a controller, an integrated circuit, a microchip, a computer, or any other computing device. The one or more processors 202 are coupled to a communication path 204 that provides signal interconnectivity between various modules of the system. The communication path 204 may communicatively couple any number of processors 202 with one another, and allow the modules coupled to the communication path 204 to operate in a distributed computing environment. Each of the modules may operate as a node that may send and/or receive data. As used herein, the term "communicatively coupled" means that coupled components are capable of exchanging data signals with one another such as, electrical signals via a conductive medium, electromagnetic signals via air, and optical signals via optical waveguides, and the like.

The communication path 204 may be formed from any medium that is capable of transmitting a signal such as, conductive wires, conductive traces, optical waveguides, or the like. In some embodiments, the communication path 204 may facilitate the transmission of wireless signals, such as WiFi, Bluetooth®, Near Field Communication (NFC), and the like. The communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. The communication path 204 may comprise a vehicle bus, such as, a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine-readable and executable instructions such that the machine-readable and executable instructions can be accessed by the one or more processors 202. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory modules 206. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 202 along with the one or more memory modules 206 may operate as a controller for the ego vehicle system 200.

Still referring to FIG. 2, the ego vehicle system 200 includes one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of connected vehicle system, such as, the first connected vehicle system 210, the second connected vehicle system 220, the distance between the ego vehicle system 200 and the first connected vehicle system 210, the distance between the ego vehicle system 200 and the second connected vehicle system 220, or combinations thereof. The one or more sensors 208 may have any resolution. In some embodiments, one or more optical components, such as a mirror, fish-eye lens, or any other type of lens may be optically coupled to the one or more sensors 208. In some embodiments, the one or more sensors 208 may provide image data to the one or more processors 202 or another component communicatively coupled to the communication path 204. In some embodiments, the one or more sensors 208 may provide navigation support. In embodiments, data captured by the one or more sensors 208 may be used to autonomously or semi-autonomously navigate the ego vehicle system 200.

In some embodiments, the one or more sensors 208 include one or more imaging sensors configured to operate in the visual and/or infrared spectrum to sense visual and/or infrared light. In some embodiments, the one or more sensors 208 include one or more LIDAR sensors, radar sensors, sonar sensors, or other types of sensors for gathering data that could be integrated into or supplement the data collection. Ranging sensors like radar sensors may be used to obtain rough depth and speed information for the view of the ego vehicle system 200.

The ego vehicle system 200 includes a satellite antenna 205 coupled to the communication path 204 such that the communication path 204 communicatively couples the satellite antenna 205 to other modules of the ego vehicle system 200. The satellite antenna 205 is configured to receive signals from global positioning system satellites. In one embodiment, the satellite antenna 205 includes one or more conductive elements that interact with electromagnetic signals transmitted by global positioning system satellites. The received signal is transformed into a data signal indicative of the location (e.g., latitude and longitude) of the satellite antenna 205 or an object positioned near the satellite antenna 205, by the one or more processors 202.

The ego vehicle system 200 includes one or more vehicle sensors 203. Each of the one or more vehicle sensors 203 are coupled to the communication path 204 and communicatively coupled to the one or more processors 202. The one or more vehicle sensors 203 may include one or more motion sensors for detecting and measuring motion and changes in the motion of the ego vehicle system 200. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the ego vehicle system 200 includes a network interface hardware 207 for communicatively coupling the ego vehicle system 200 to the second connected vehicle system 220. The network interface hardware 207 may be communicatively coupled to the communication path 204 and may be any device capable of transmitting and/or receiving data via a network. The network interface hardware 207 may include a communication transceiver for sending and/or receiving any wired or wireless communication. For example, the network interface hardware 207 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 207 includes hardware configured to operate in accordance with the Bluetooth® wireless communication protocol. The network interface hardware 207 of the ego vehicle system 200 may transmit its data to the second connected vehicle system 220. For example, the network interface hardware 207 of the ego vehicle system 200 may transmit vehicle data, location data, maneuver data, and the like to other objects, a cloud server, edge servers, and the like.

The ego vehicle system 200 may connect with one or more external vehicle systems (e.g., the first connected vehicle system 210, the second connected vehicle system 220) and/or external processing devices (e.g., a cloud server, or an edge server) via a direct connection. The direct connection may be a vehicle-to-vehicle connection ("V2V connection"), a vehicle-to-everything connection ("V2X connection"), or an mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The ego vehicle system 200 may communicate with external communicate vehicle systems using wireless messages such as basic safety messages (BSMs), maneuver messages (MMs), and the like. BSM is a wireless message transmitted between vehicles where the transmitter sends its position, speed, and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

Vehicles may function as infrastructure nodes to form a mesh network and connect dynamically on an ad-hoc basis.

In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using centralized servers and other central computing devices to store and/or relay information between vehicles.

Still referring to FIG. 2, the ego vehicle system 200 may be communicatively coupled to the first connected vehicle system 210, the second connected vehicle system 220 or the server 240 by the network 270. In one embodiment, the network 270 may include one or more computer networks (e.g., a personal area network, a local area network, or a wide area network), cellular networks, satellite networks and/or a global positioning system and combinations thereof. The ego vehicle system 200 may be communicatively coupled to the network 270 via a wide area network, via a local area network, via a personal area network, via a cellular network, via a satellite network, etc. Suitable local area networks may include wired Ethernet and/or wireless technologies such as, Wi-Fi. Suitable personal area networks may include wireless technologies such as, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the first connected vehicle system 210 includes one or more processors 212, one or more memory modules 216, one or more sensors 218, one or more vehicle sensors 213, a satellite antenna 215, a network interface hardware 217, and a communication path 214 communicatively connected to the other components of first connected vehicle system 210. The components of the first connected vehicle system 210 may be structurally similar to and have similar functions as the corresponding components of the ego vehicle system 200 (e.g., the one or more processors 212 corresponds to the one or more processors 202, the one or more memory modules 216 corresponds to the one or more memory modules 206, the one or more sensors 218 corresponds to the one or more sensors 208, the one or more vehicle sensors 213 corresponds to the one or more vehicle sensors 203, the satellite antenna 215 corresponds to the satellite antenna 205, the communication path 214 corresponds to the communication path 204, and the network interface hardware 217 corresponds to the network interface hardware 207).

Still referring to FIG. 2, the second connected vehicle system 220 includes one or more processors 222, one or more memory modules 226, one or more sensors 228, one or more vehicle sensors 223, a satellite antenna 225, a network interface hardware 227, and a communication path 224 communicatively connected to the other components of second connected vehicle system 220. The components of second connected vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 223 corresponds to the one or more vehicle sensors 213, the satellite antenna 225 corresponds to the satellite antenna 215, the communication path 224 corresponds to the communication path 204, and the network interface hardware 227 corresponds to the network interface hardware 217).

Still referring to FIG. 2, the server 240 includes one or more processors 244, one or more memory modules 246, a network interface hardware 248, one or more vehicle sensors 249, and a communication path 242 communicatively connected to the other components of the ego vehicle system 200 and/or the other components of second connected vehicle system 220. The components of the server 240 may be structurally similar to and have similar functions as the corresponding components of first connected vehicle system 210 (e.g., the one or more processors 244 corresponds to the one or more processors 212, the one or more memory modules 246 corresponds to the one or more memory modules 216, the one or more vehicle sensors 249 corresponds to the one or more vehicle sensors 213, the communication path 242 corresponds to the communication path 214, and the network interface hardware 248 corresponds to the network interface hardware 217), and second connected vehicle system 220 (e.g., the one or more processors 244 corresponds to the one or more processors 222, the one or more memory modules 246 corresponds to the one or more memory modules 226, the one or more vehicle sensors 249 corresponds to the one or more vehicle sensors 223, the communication path 242 corresponds to the communication path 224, and the network interface hardware 248 corresponds to the network interface hardware 227).

It should be understood that the components illustrated in FIG. 2 are merely illustrative and are not intended to limit the scope of this disclosure. More specifically, while the components in FIG. 2 are illustrated as residing within the ego vehicle system 200, the first connected vehicle system 210, the second connected vehicle system 220, or combinations thereof, this is a non-limiting example. In some embodiments, one or more of the components may reside external to the ego vehicle system 200, the first connected vehicle system 210, or the second connected vehicle system 220, such as with the server 240.

Figure 3:
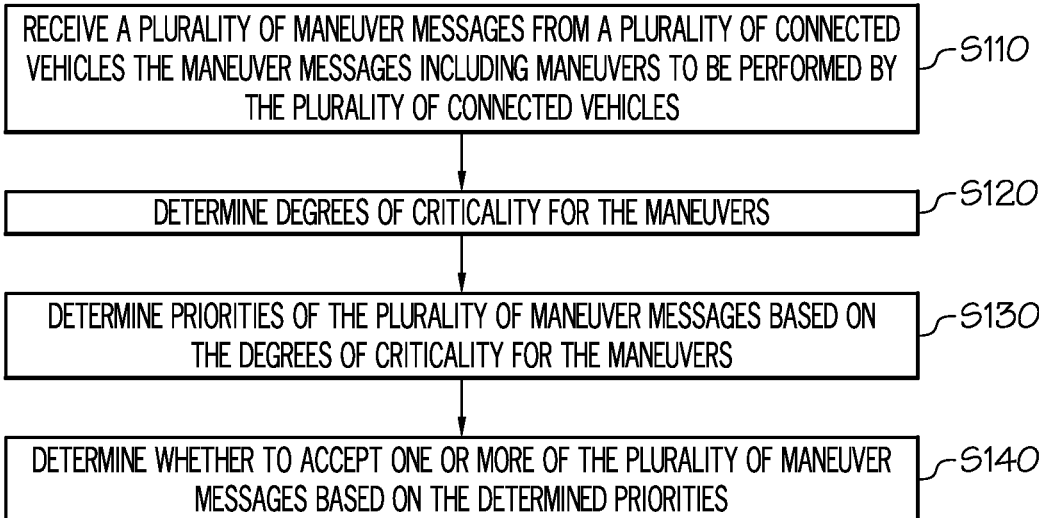
FIG. 3 depicts a flowchart for a method of prioritizing a plurality of maneuver messages, according to one or more embodiments shown and described herein.

FIG. 3 depicts a flowchart for a method of prioritizing a plurality of maneuver messages, according to one or more embodiments shown and described herein.

Referring to FIG. 3, in step S110, the controller may receive a plurality of maneuver messages from a plurality of connected vehicles. The controller may be included in the ego vehicle, the server, connected vehicles, road side units, cameras, or combinations thereof. For example, referring to FIGS. 1A, 1B, 4A, 4B, 5A, 5B, 6A, 6B, 7A, and 7B, the controller may receive maneuver messages from the first connected vehicle 120 and the second connected vehicle 130. The controller may receive the first maneuver message MM1 from the first connected vehicle 120 and the second maneuver message MM2 from the second connected vehicle 130. Each of maneuver message may include maneuvers to be performed by the plurality of connected vehicles. For example, referring to FIGS. 1A and 1B, the first maneuver message MM1 from the first connected vehicle 120 may include a first maneuver related to a lane change from the right lane to the middle lane in front of the ego vehicle 110. The second maneuver message MM2 from the second connected vehicle 130 may include a second maneuver related to a lane change from the left lane to the middle lane in front of the ego vehicle 110. For example, referring to FIGS. 4A-4C, the first maneuver message MM1 from the first connected vehicle 120 may include a first maneuver related to the lane change from the right lane to the middle lane in front of the ego vehicle 110. The first maneuver may include distance information about a shortest distance D1 between the incident and the first connected vehicle 120. The second maneuver message MM2 from the second connected vehicle 130 may include a second maneuver related to the lane change from the right lane to the middle lane in front of the ego vehicle 110. The second maneuver may include distance information about a shortest distance D2 between the incident and the second connected vehicle 130.

Figure 5A:
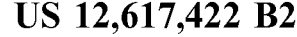
FIGS. 5A-5C schematically depict an exemplary embodiment of prioritizing a plurality of maneuver messages where the on-ramp and off-ramp are close to each other, according to one or more embodiments shown and described herein.
Figure 5B:
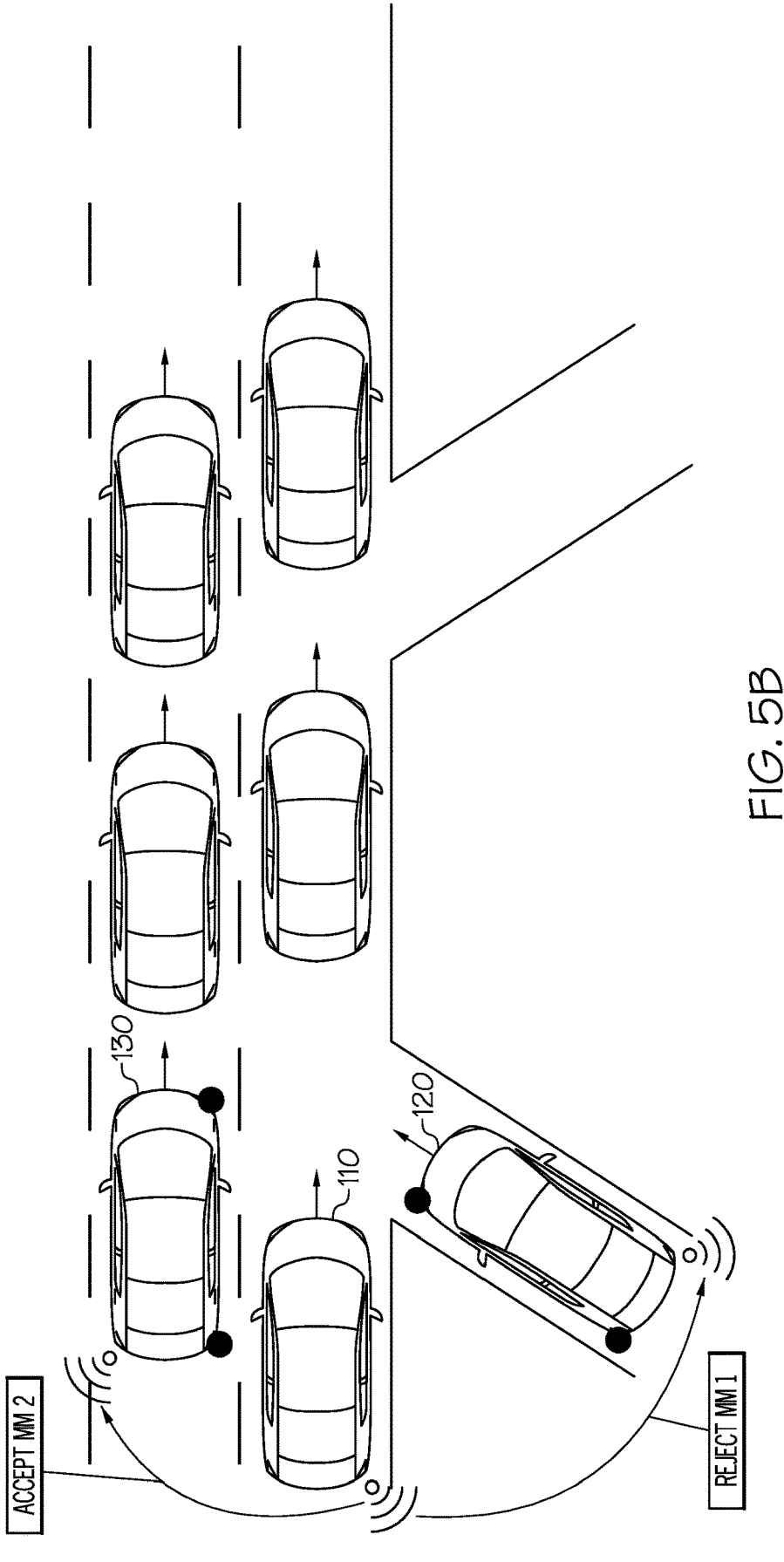

As another example, referring to FIGS. 5A and 5B, the first maneuver message MM1 from the first connected vehicle 120 may include a first maneuver related to merging onto the main road in front of the ego vehicle 110. The second maneuver message MM2 from the second connected vehicle 130 may include a second maneuver related to the lane change from the current lane to the rightmost lane in front of the ego vehicle 110. For example, referring to FIGS. 6A and 6B, the first maneuver message MM1 from the first connected vehicle 120 may include a first maneuver related to merging onto the main road in front of the ego vehicle 110. The second maneuver message MM2 from the second connected vehicle 130 may include a second maneuver related to the lane change from the current lane to the rightmost lane in front of the ego vehicle 110.

Figure 7A:
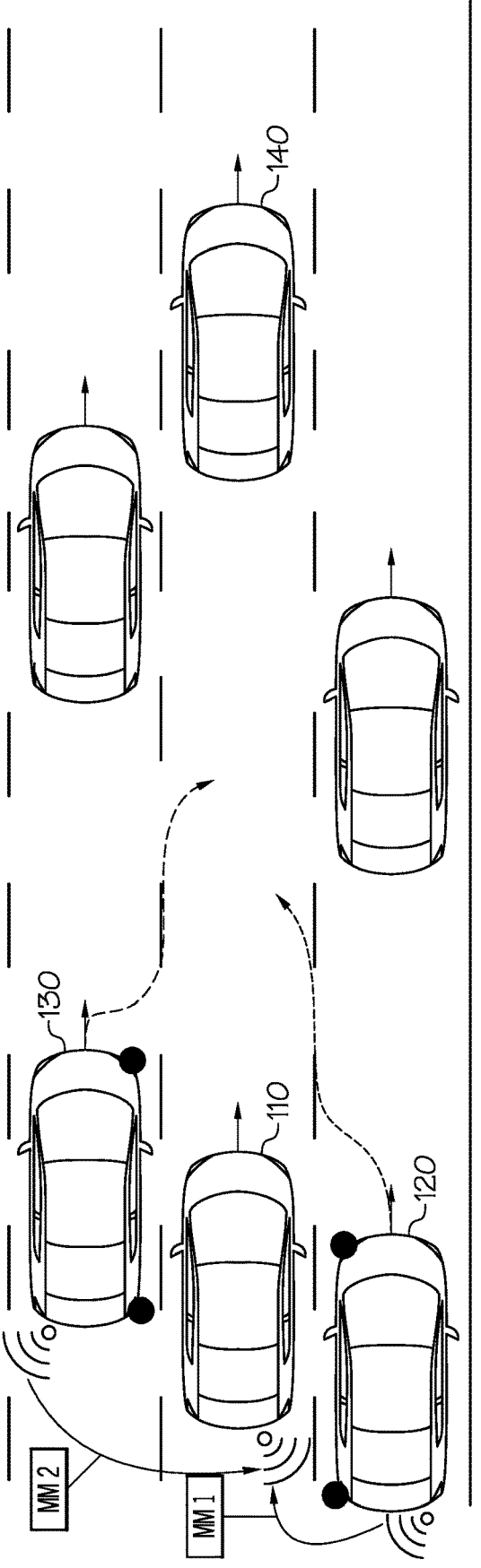
FIGS. 7A-7D schematically depict an exemplary embodiment of prioritizing a plurality of maneuver messages including lane exchanges on a three-lane highway, according to one or more embodiments shown and described herein.
Figure 7B:
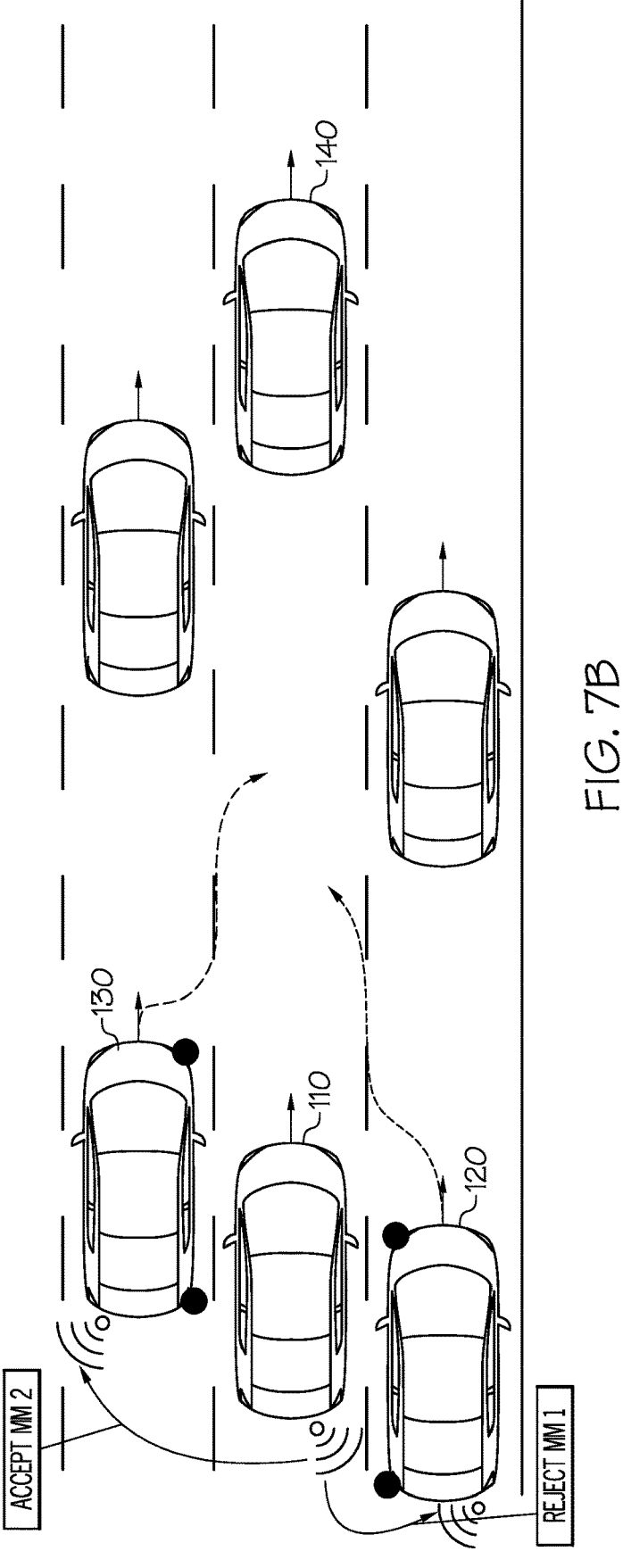

As another example, referring to FIGS. 7A and 7B, the first maneuver message MM1 from the first connected vehicle 120 may include a first maneuver related to the lane change from the right lane to the middle lane in front of the ego vehicle 110. The second maneuver message MM2 from the second connected vehicle 130 may include a second maneuver related to the lane change from the left lane to the middle lane in front of the ego vehicle 110.

In some embodiments, the controller may set a predetermined time period of receiving maneuver messages. The controller may stop receiving additional maneuver messages or shorten the predetermined time period of receiving maneuver messages in response to receiving an emergency maneuver message from one of the plurality of maneuver messages during the predetermined time period. The controller may determine that the emergency maneuver message has higher priority than no emergency maneuver messages.

In some embodiments, the controller may extend the predetermined time period for receiving maneuver messages in response to determining that no emergency maneuver message is received during the predetermined time period.

Referring back to FIG. 3, in step S120, the controller may determine degrees of criticality for the maneuvers. In some embodiments, the degrees of criticality for the maneuvers may include degrees of conflict caused by the maneuvers to be performed by the plurality of connected vehicles.

In some embodiments, when the controller determines degrees of criticality for the maneuvers, the degrees of criticality for the maneuvers may include a plurality of benefit values related to performing the maneuvers. The benefit values may include comfort aspects, time efficiency aspects, energy efficiency, or combinations thereof. The benefit values may include an impact predicted based on the maneuver messages. The impact may include whether a conflict would occur, the severity of the potential conflict, the effect of the maneuver on the ego vehicle, the effect of the maneuver on the first connected vehicle, the effect of the maneuver on the second connected vehicle, the effect of the maneuver on traffic flow, or combinations thereof. Comfort aspects may include comfort of driver of ego vehicle, comfort of driver of connected vehicles, comfort of driver of unconnected vehicles, or combinations thereof. The comfort may include acceleration, jerk, brake, or combinations thereof. Time efficiency aspects may include time to collision, travel time, or both.

Referring back to FIG. 3, in step S120, in some embodiments, the degrees of criticality for the maneuvers may include information about whether the maneuvers are mandatory or discretionary. For example, referring to FIGS. 1A and 1B, the controller may determine that the first maneuver includes a mandatory lane change to avoid conflict or collision in the right lane. The controller may determine that the second maneuver includes a discretionary lane change because the lane change of the second connected vehicle 130 is not critical to avoid conflict or collision in the left lane. For example, referring to FIGS. 4A and 4B, the controller may determine that the first maneuver includes a mandatory lane change in front of the ego vehicle 110 to avoid conflict or collision in the right lane. In some embodiments, the controller may determine that the second maneuver includes a mandatory lane change in front of the ego vehicle 110 to avoid conflict or collision in the right lane.

Figure 8:
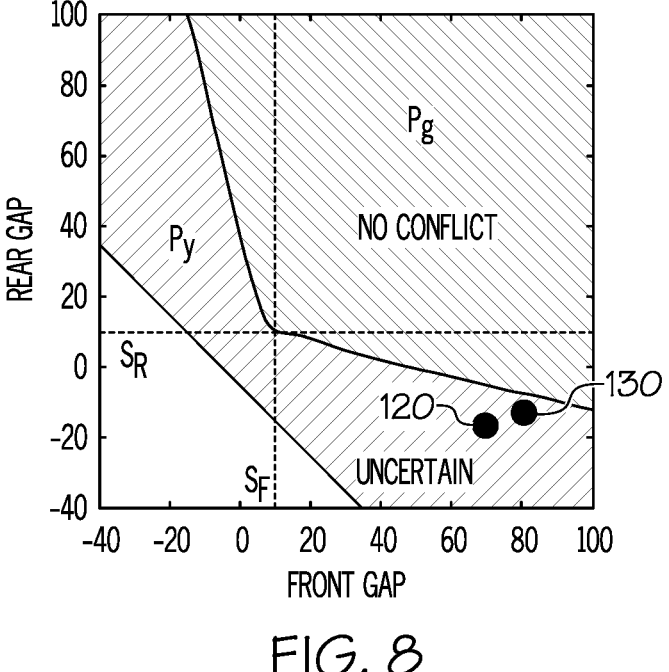
FIG. 8 schematically depicts a conflict chart, according to one or more embodiments shown and described herein.

Referring back to FIG. 3, in step S120, in some embodiments, the degrees of criticality for the maneuvers may include information related to the position of the corresponding connected vehicle in a conflict chart. FIG. 8 schematically depicts a conflict chart, according to one or more embodiments shown and described herein. Referring to FIG. 8, the conflict chart may be defined by a front gap and a rear gap. The front gap may be defined as a distance between the connected vehicle, which is sending a maneuver message to the ego vehicle, and the vehicle in front of the ego vehicle. The rear gap may be defined as a distance between the connected vehicle, which is sending a maneuver message to the ego vehicle, and the ego vehicle. The conflict chart may comprise a no conflict domain, an uncertain domain, and a conflict domain. In FIG. 8, the conflict chart may comprise the no conflict domain and the uncertain domain. In FIG. 8, the conflict chart may not include the conflict domain. The conflict domain may be defined as a domain where there is greater than or equal to a first percentage (e.g., 90 percent (%)) of the possibility of conflict between the ego vehicle and the connected vehicle sending a maneuver message to the ego vehicle when the connected vehicle perform the maneuver included in the maneuver message. In the conflict domain, the maneuver from the connected vehicle may be almost impossible to cooperate on. The no-conflict domain may be defined as a domain where there is less than or equal to a second percentage (e.g., 10%) of the possibility of conflict between the ego vehicle and the connected vehicle sending a maneuver message to the ego vehicle when the connected vehicle perform the maneuver included in the maneuver message. In the no-conflict domain, little or no action of the ego vehicle, compared to the uncertain domain, is required to cooperate the maneuver from the connected vehicle. The uncertain domain may be defined as a domain where there is a greater than the second percentage (e.g., 10%) and less than the first percentage (e.g., 90%) of the possibility of conflict between the ego vehicle and the connected vehicle sending a maneuver message to the ego vehicle when the connected vehicle perform the maneuver included in the maneuver message. In the uncertain domain, significant action of the ego vehicle, compared to the no-conflict domain, is required to cooperate the maneuver from the connected vehicle.

Referring to FIGS. 7A, 7B, and 8, when the first maneuver includes a lane change from the right lane to the middle lane using the gap formed by the ego vehicle 110 and the vehicle 140 in front of the ego vehicle 110, the controller may determine that a position of the first connected vehicle 120 is positioned in the uncertain domain of the conflict chart. When the second maneuver includes a lane change from the left lane to the middle lane using the gap formed by the ego vehicle 110 and the vehicle 140 in front of the ego vehicle 110, the controller may determine that the position of the second connected vehicle 130 is positioned in the uncertain domain of the conflict chart.

Referring back to FIG. 3, in step S130, the controller may determine the priorities of the plurality of maneuver messages based on the degrees of criticality for the maneuvers.

In some embodiments, the controller may determine the priorities of the plurality of maneuver messages to maximize the sum of the benefit values of the ego vehicle. For example, when the ego vehicle receives two mandatory maneuver messages and could accept only one maneuver message, the controller may select the maneuver message with a lower negative impact on the ego vehicle. For example, a slight brake of the ego vehicle may have a lower negative impact on the ego vehicle than a harsh brake of the ego vehicle.

In some embodiments, the controller may determine the priorities of the plurality of maneuver messages to maximize the sum of the benefit values of the ego vehicle and the connected vehicles. The sum of the benefit values of the ego vehicle and the connected vehicles may be calculated by the following equation 1.

$$J_{Total} = J_R + \sum\nolimits_i K_i \cdot J(C_i) \qquad \text{[Equation 1]}$$

where $J_R$ is the sum of the benefit values of the ego vehicle and a larger $K_i$ is used to emphasize the benefit to the connected vehicle $C_i$ sending the maneuver messages.

In some embodiments, the controller may determine the priorities of the plurality of maneuver messages to maximize the sum of the benefit values of the ego vehicle, the connected vehicles, and the unconnected vehicles. The sum of the benefit values of the ego vehicle, the connected vehicles, and the unconnected vehicles may be calculated by the following equation 2.

$$J_{Total} = J_R + \sum\nolimits_i I_T(i) \cdot K_i \cdot J(C_i) \qquad \text{[Equation 2]}$$

where the indicator function $I_T(i)$ is 1 when the $C_i$ is a connected vehicle and 0 when the $C_i$ is an unconnected vehicle.

In some embodiments, the sum of the benefit values of the ego vehicle, the connected vehicles, and the unconnected vehicles may be calculated by the following equation 3.

$$J_{Total} = J_R + \sum\nolimits_i K_i \cdot J(C_i) + \sum\nolimits_j L_j \cdot J(U_j) \qquad \text{[Equation 3]}$$

where $U_j$ is an unconnected vehicle, "j" is indexed by ranging from 1 to M (the number of vehicles in the traffic scenario), and $L_j$ represents the gain which determines the relevance of unconnected vehicle J to the total benefit values.

For example, referring to FIGS. 1A-1D, when the ego vehicle 110 receives both mandatory maneuver message and discretionary maneuver message and could accept only one maneuver message, the controller may determine that the negative gain of rejecting a mandatory maneuver message may be more than the negative gain of rejecting a discretionary maneuver message. The controller may determine that accepting the mandatory maneuver message has higher total benefits for the ego vehicle and the connected vehicles. The controller may determine that the first maneuver including a mandatory lane change to avoid conflict or collision in the right lane from the first connected vehicle 120 may have higher priority than the second maneuver including a discretionary lane change from the second connected vehicle 130.

Figure 4A:
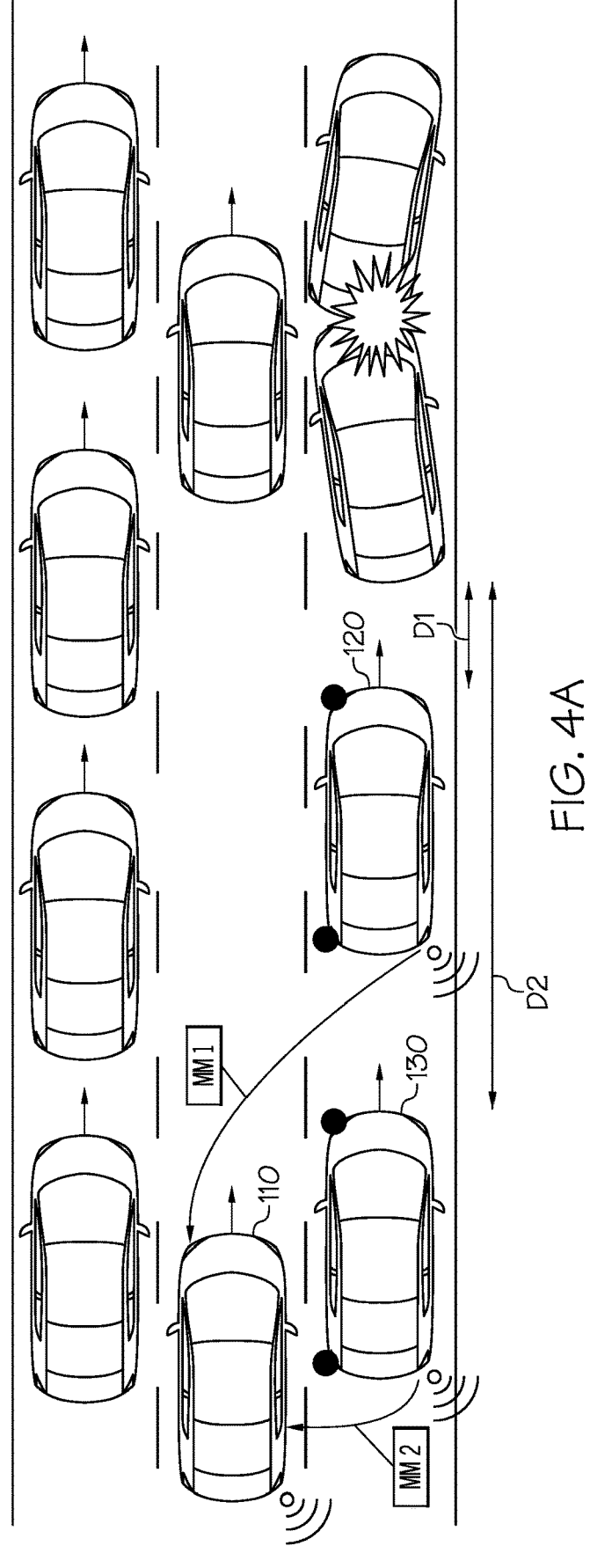
FIGS. 4A-4C schematically depict an exemplary embodiment of prioritizing a plurality of maneuver messages including lane exchanges on a three-lane highway, according to one or more embodiments shown and described herein.
Figure 4B:
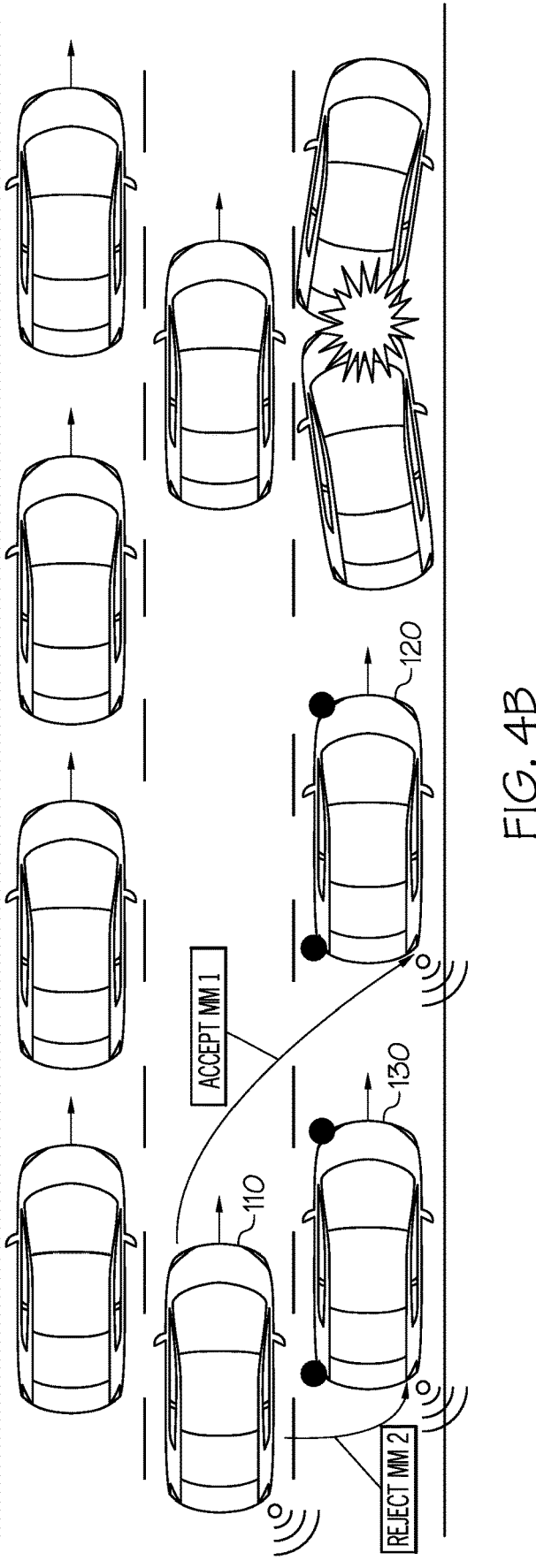
Figure 4C:
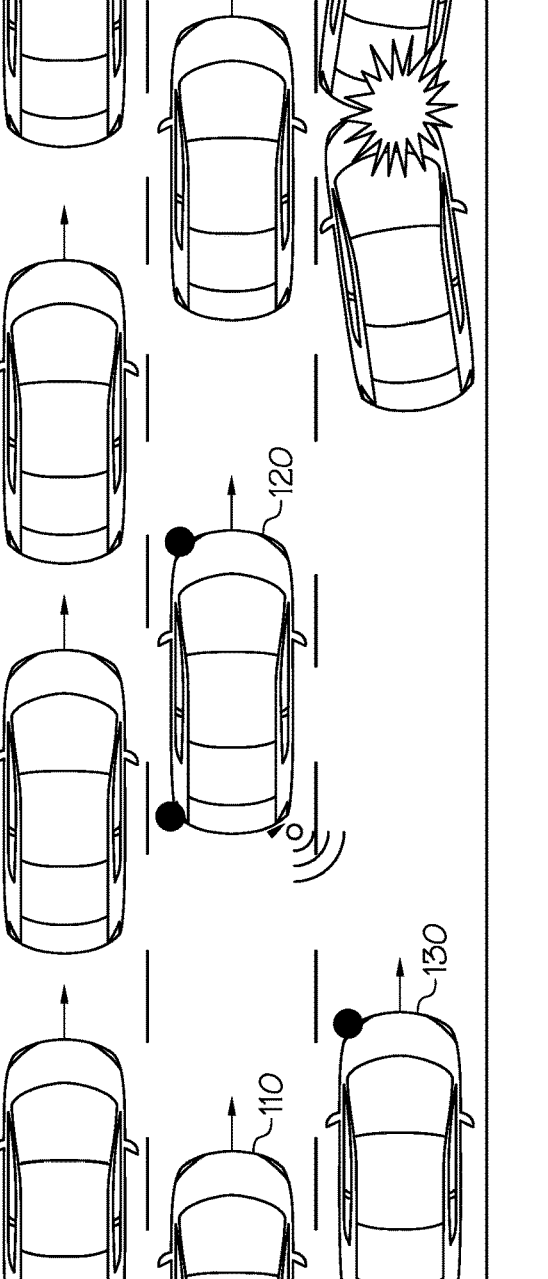

For example, referring to FIGS. 4A-4C, when the ego vehicle 110 receives mandatory maneuver messages with the same turning point and could accept only one maneuver message, the controller may determine that rejecting the maneuver message from the first connected vehicle 120 closer to the turning point will have more negative gain than rejecting the maneuver message from the second connected vehicle 130. The controller may prioritize maneuver messages based on the distance between connected vehicles and the turning point. The controller may determine that accepting the maneuver message from the first connected vehicle 120 closer to the turning point has higher total benefits for the ego vehicle and the connected vehicles.

In some embodiments, when the ego vehicle 110 receives a plurality of maneuver messages, to maximize the sum of the benefit values of the ego vehicle, the connected vehicles, and the unconnected vehicles, the controller may consider whether a conflict would occur, the severity of the potential conflict, the effect of the maneuver on the ego vehicle 110, the effect of the maneuver on the first connected vehicle 120, the effect of the maneuver on the second connected vehicle 130, the effect of the maneuver on traffic flow, or combinations thereof. For example, referring to FIGS. 5A-5C, the first maneuver message MM1 shows that the first connected vehicle 120 is traveling slower on ramp and intended maneuver of the first connected vehicle 120, merging in front of the ego vehicle 110. The controller may determine that the first maneuver message MM1 requires the ego vehicle 110 to brake harshly, which may lead to a conflict and impact traffic behind. The second maneuver message MM2 shows that the second connected vehicle 130 is traveling faster in the inner lane. The controller may determine that the second maneuver message MM2 does not require a harsh brake of the ego vehicle 110. The controller may further determine that missing an exit may cause a long detour for the second connected vehicle 130 while the first connected vehicle 120 may still merge behind the ego vehicle 110. Based on the degrees of criticality for the maneuvers, the controller may determine the sum of benefit values of the ego vehicle 110, the first connected vehicle 120, the second connected vehicle 130, and unconnected vehicles, or combinations thereof, related to the first maneuver message MM1 is lower than the sum of benefit values of the ego vehicle 110, the first connected vehicle 120, the second connected vehicle 130, and unconnected vehicles, or combinations thereof, related to the second maneuver message MM2 from the second connected vehicle 130. The controller may determine that the second maneuver message MM2 has higher priority than the first maneuver message MM1.

Referring to FIGS. 6A-6D, when the ego vehicle 110 receives a plurality of maneuver messages, the first maneuver message MM1 shows that the first connected vehicle 120 is traveling slower on ramp and intended maneuver of first connected vehicle 120, merging in front of the ego vehicle 110. The controller may determine that the first maneuver message MM1 requires the ego vehicle 110 to brake slightly, which may not lead to a conflict and impact traffic behind. The second maneuver message MM2 shows that the second connected vehicle 130 is traveling faster in the inner lane. The controller may determine that the second maneuver message MM2 requires the ego vehicle 110 to brake slightly, which may not lead to a conflict and impact traffic behind. Based on the degrees of criticality for the maneuvers, the controller may determine the sum of benefit values of the ego vehicle 110, the first connected vehicle 120, the second connected vehicle 130, and unconnected vehicles, or combinations thereof, related to the first maneuver message MM1 is lower than the sum of benefit values of the ego vehicle 110, the first connected vehicle 120, the second connected vehicle 130, and unconnected vehicles, or combinations thereof, related to the second maneuver message MM2 from the second connected vehicle 130. The controller may determine that the second maneuver message MM2 has higher priority than the first maneuver message MM1.

Referring back to FIG. 3, in step S130, in some embodiments, when the controller determines priorities of the plurality of maneuver messages, the mandatory maneuver message may have higher priority than the discretionary maneuver message. For example, referring to FIGS. 1A and 1B, the controller may determine that the first maneuver including a mandatory lane change to avoid conflict or collision in the right lane from the first connected vehicle 120 has higher priority than the second maneuver including a discretionary lane change from the second connected vehicle 130

Referring back to FIG. 3, in step S130, in some embodiments, when the controller determines priorities of the plurality of maneuver messages, the controller may determine that a position in the no conflict domain has higher priority that a position in the uncertain domain or the conflict domain. Referring to FIGS. 7A, 7B, and 8, in response to determining that the positions of the first connected vehicle 120 and the second connected vehicle 130 are in the uncertain domain, the controller may determine priorities of the first maneuver message MM1 from the first connected vehicle 120 and the second maneuver message MM2 from the second connected vehicle 130 based on comparison of a shortest distance between the position of the first connected vehicle 120 in the conflict chart and the no conflict domain and a shortest distance between the position of the second connected vehicle 130 in the conflict chart and the no conflict domain. For example, when a shortest distance between the position of the first connected vehicle 120 in the conflict chart and the no conflict domain is longer than a shortest distance between the position of the second connected vehicle 130 in the conflict chart and the no conflict domain, the controller may determine that the second maneuver message MM2 has higher priority than the first maneuver message MM1.

In some embodiments, when the controller determines that the position of the first connected vehicle 120 is in the no conflict domain and the position of the second connected vehicle 130 is in the uncertain domain or the conflict domain (not shown), the controller may determine that the first maneuver message MM1 from the first connected vehicle 120 has higher priority than the second maneuver message MM2 from the second connected vehicle 130.

Referring back to FIG. 3, in step S140, the controller may determine whether to accept one or more of the plurality of maneuver messages based on the determined priorities. For example, referring to FIGS. 1A, 1B, 4A, 4B, 5A, 5B, 7A, and 7B, due to the traffic scenario and the traffic density, the ego vehicle 110 may not accept all maneuver messages. The controller may accept one maneuver message and reject other maneuver messages. For example, referring to FIGS. 1A and 1B, the controller may accept the first maneuver message MM1 from the first connected vehicle 120 and reject the second maneuver message MM2 from the second connected vehicle 130. For example, referring to FIGS. 4A-4C, the controller may accept the first maneuver message MM1 from the first connected vehicle 120 and reject the second maneuver message MM2 from the second connected vehicle 130. For example, referring to FIGS. 5A and 5B, the controller may accept the second maneuver message MM2 from the second connected vehicle 130 and reject the first maneuver message MM1 from the first connected vehicle 120. For example, referring to FIGS. 7A and 7B, the controller may accept the second maneuver message MM2 from the second connected vehicle 130 and reject the first maneuver message MM1 from the first connected vehicle 120.

Figure 6A:
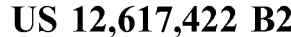
FIGS. 6A-6C schematically depict an exemplary embodiment of prioritizing a plurality of maneuver messages where the on-ramp and off-ramp are close to each other, according to one or more embodiments shown and described herein.
Figure 6B:
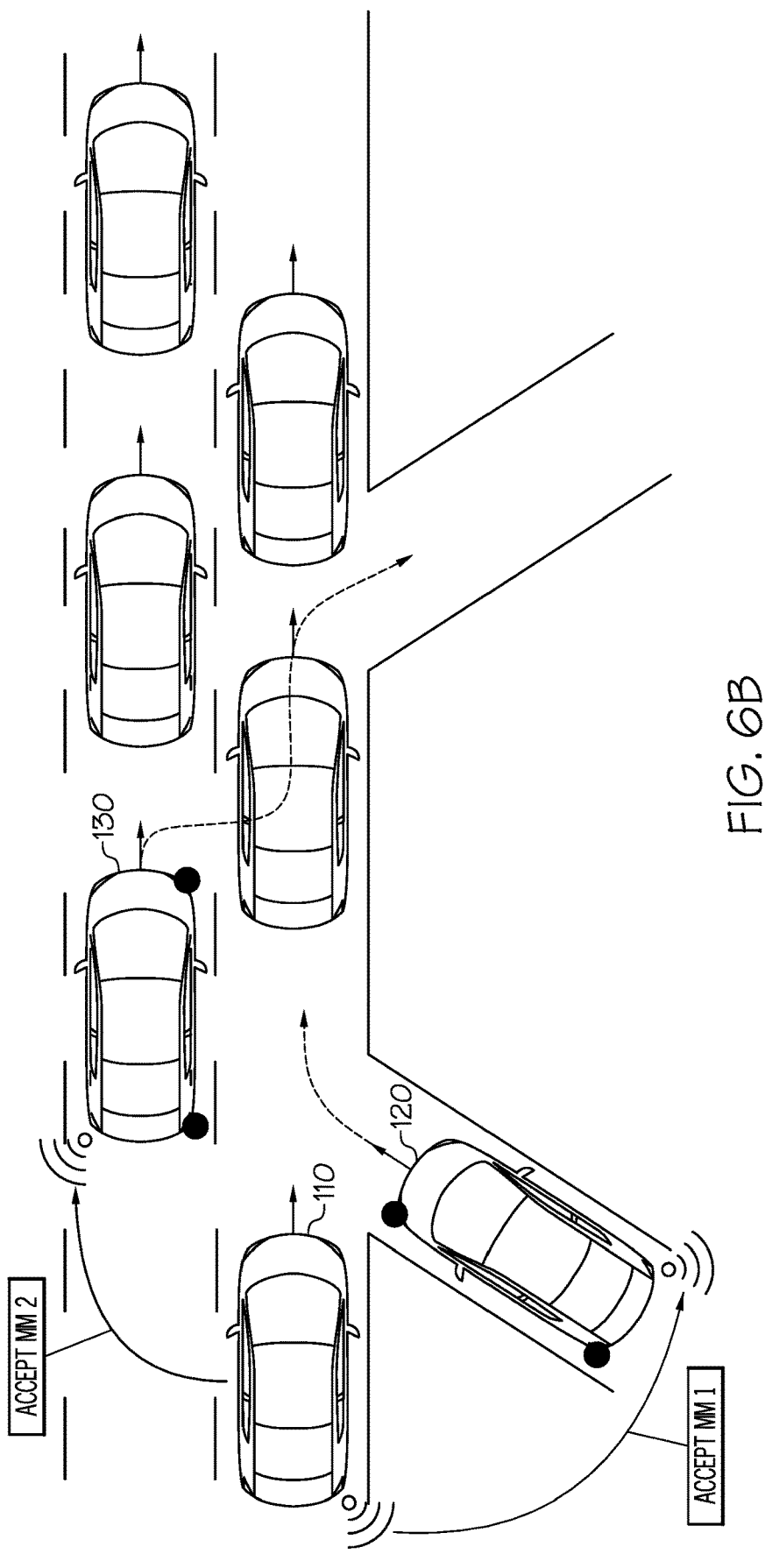

In some embodiments, referring to FIGS. 6A and 6B, the controller may accept more than one maneuver messages. For example, the controller may accept all maneuver messages. For example, referring to FIGS. 6A and 6B, considering the traffic scenario and the traffic density, the ego vehicle 110 may accept both the first maneuver message MM1 from the first connected vehicle 120 and the second maneuver message MM2 from the second connected vehicle 130.

In some embodiments, the controller may transmit acceptance messages, denial messages, or both to the plurality of connected vehicles. For example, referring to FIGS. 1A and 1B, the controller may transmit an acceptance message to the first connected vehicle 120. The controller may transmit a denial message to the second connected vehicle 130. For example, referring to FIGS. 4A and 4B, the controller may transmit an acceptance message to the first connected vehicle 120. The controller may transmit a denial message to the second connected vehicle 130. For example, referring to FIGS. 5A and 5B, the controller may transmit an acceptance message to the second connected vehicle 130. The controller may transmit a denial message to the first connected vehicle 120. For example, referring to FIGS. 6A and 6B, the controller may transmit an acceptance message to the first connected vehicle 120. The controller may transmit an acceptance message to the second connected vehicle 130. For example, referring to FIGS. 7A and 7B, the controller may transmit an acceptance message to the second connected vehicle 130. The controller may transmit a denial message to the first connected vehicle 120.

Referring back to FIG. 3, in some embodiments, the controller may instruct a display of an output device of the ego vehicle, a display of a device of the driver of the ego vehicle, a display of an output device of the first connected vehicle, a display of a device of the driver of the first connected vehicle, a display of an output device of the second connected vehicle, a display of a device of the driver of the second connected vehicle, combinations thereof, to display acceptance messages, denial messages, or both. In embodiments, the output device of the ego vehicle, the device of the driver of the ego vehicle, the output device of the first connected vehicle, the device of the driver of the first connected vehicle, the output device of the second connected vehicle, the device of the driver of the second connected vehicle, or combinations thereof, may include a smartphone, a smartwatch, a laptop, a tablet computer, a personal computer, and a wearable device, or combinations thereof.

In some embodiments, after the controller accepts one or more of maneuver messages, the ego vehicle and connected vehicles may perform a cooperative maneuver. For example, by referring to FIGS. 1C and 1D, the ego vehicle 110 and the first connected vehicle 120 may perform a cooperative maneuver, such as a lane change of the first connected vehicle 120 from the right lane to the middle lane. The second connected vehicle 130 may keep moving in the left lane without a lane change. By referring to FIG. 4C, the ego vehicle 110 and the first connected vehicle 120 may perform a cooperative maneuver, such as a lane change of the first connected vehicle 120 from the right lane to the middle lane. The second connected vehicle 130 may keep moving in the right lane without a lane change. By referring to FIG. 5C, the ego vehicle 110 and the second connected vehicle 130 may perform a cooperative maneuver, such as a lane change of the second connected vehicle 130 to the rightmost lane in front of the ego vehicle 110. The first connected vehicle 120 may keep moving in the on ramp. By referring to FIGS. 6C and 6D, the ego vehicle 110, the first connected vehicle 120, and the second connected vehicle 130 may perform a cooperative maneuver, such as the ego vehicle 110 slightly brakes to let the first connected vehicle 120 merge onto the main road, and in the meantime, let the second connected vehicle 130 change lanes. By referring to FIGS. 7C and 7D, the ego vehicle 110 and the second connected vehicle 130 may perform a cooperative maneuver, such as a lane change of the second connected vehicle 130 from the left lane to the middle lane in front of the ego vehicle 110. The first connected vehicle 120 may keep moving in the right lane without a lane change.

FIGS. 4A-4C schematically depict an exemplary embodiment of prioritizing a plurality of maneuver messages including lane exchanges on a three-lane highway, according to one or more embodiments shown and described herein.

Referring to FIGS. 4A-4C, the ego vehicle 110, the first connected vehicle 120, and the second connected vehicle 130 may be on a three-lane highway where there is an incident on the highway in the right lane on the three-lane highway. The ego vehicle 110 may be in the middle lane of the three-lane highway. The first connected vehicle 120 and the second connected vehicle 130 may be in the right lane of the three-lane highway. The first connected vehicle 120 may want to make a lane change from the right lane to the middle lane in front of the ego vehicle 110 to avoid the incident. The second connected vehicle 130 may be in the behind of the first connected vehicle 120. The second connected vehicle 130 may also want to make a lane change from the right lane to the middle lane in front of the ego vehicle 110 to avoid the incident.

The ego vehicle 110 may receive the first maneuver message MM1 from the first connected vehicle 120 and the second maneuver message MM2 from the second connected vehicle 130. The first maneuver message MM1 from the first connected vehicle 120 may include a first maneuver related to the lane change from the right lane to the middle lane in front of the ego vehicle 110. The first maneuver may include distance information about a shortest distance D1 between the incident and the first connected vehicle 120. The second maneuver message MM2 from the second connected vehicle 130 may include a second maneuver related to the lane change from the right lane to the middle lane in front of the ego vehicle 110. The second maneuver may include distance information about a shortest distance D2 between the incident and the second connected vehicle 130.

Still referring to FIGS. 4A-4C, after receiving the first maneuver message MM1 from the first connected vehicle 120 and the second maneuver message MM2 from the second connected vehicle 130, the ego vehicle 110 may evaluate criticality for the maneuvers. In some embodiments, the ego vehicle 110 may determine that the first maneuver includes a mandatory lane change in front of the ego vehicle 110 to avoid conflict or collision in the right lane. In some embodiments, the ego vehicle 110 may determine that the second maneuver includes a mandatory lane change in front of the ego vehicle 110 to avoid conflict or collision in the right lane.

The ego vehicle 110 may determine priorities of the first maneuver message MM1 from the first connected vehicle 120 and the second maneuver message MM2 from the second connected vehicle 130. The ego vehicle 110 may determine priorities of the first maneuver message MM1 and the second maneuver message MM2 to maximize the sum of the benefit values of the ego vehicle 110, the first connected vehicle 120, the second connected vehicle 130, the unconnected vehicles, or combinations thereof. In some embodiments, the ego vehicle 110 may determine priorities of the first maneuver message MM1 and the second maneuver message MM2 by comparison of a shortest distance D1 between the incident and the first connected vehicle 120 and a shortest distance D2 between the incident and the second connected vehicle 130. The ego vehicle 110 may determine that sum of the benefit values of the ego vehicle 110, the first connected vehicle 120, the second connected vehicle 130, the unconnected vehicles, or combinations thereof related to first maneuver message MM1 is higher than sum of the benefit values of the ego vehicle 110, the first connected vehicle 120, the second connected vehicle 130, the unconnected vehicles, or combinations thereof related to second maneuver message MM2. The ego vehicle 110 may determine that the first maneuver message MM1 may have higher priority than the second maneuver message MM2 because a shortest distance D1 between the incident and the first connected vehicle 120 is shorter than a shortest distance D2 between the incident and the second connected vehicle 130.

Still referring to FIGS. 4A-4C, due to the traffic scenario and the traffic density, the ego vehicle 110 may not accept all maneuver messages. For example, the ego vehicle 110 may accept the first maneuver message MM1 from the first connected vehicle 120 and reject the second maneuver message MM2 from the second connected vehicle 130. The acceptance message, the denial message, or both, may include maneuver information about a lane change of the first connected vehicle 120 from the right lane to the middle lane in front of the ego vehicle 110.

In some embodiments, the ego vehicle 110 may transmit an acceptance message to the first connected vehicle 120. The ego vehicle 110 may transmit a denial message to the second connected vehicle 130.

Referring to FIG. 4C, after the ego vehicle 110 accepts the first maneuver message MM1 from the first connected vehicle 120 and rejects the second maneuver message MM2 from the second connected vehicle 130, the ego vehicle 110 and the first connected vehicle 120 may perform a cooperative maneuver, such as a lane change of the first connected vehicle 120 from the right lane to the middle lane. The second connected vehicle 130 may keep moving in the right lane without a lane change. In some embodiments, after the first connected vehicle 120 makes a lane change, the ego vehicle 110 and the second connected vehicle 130 may perform a cooperative maneuver, such as a lane change of the second connected vehicle 130 from the right lane to the middle lane.

Figure 5C:
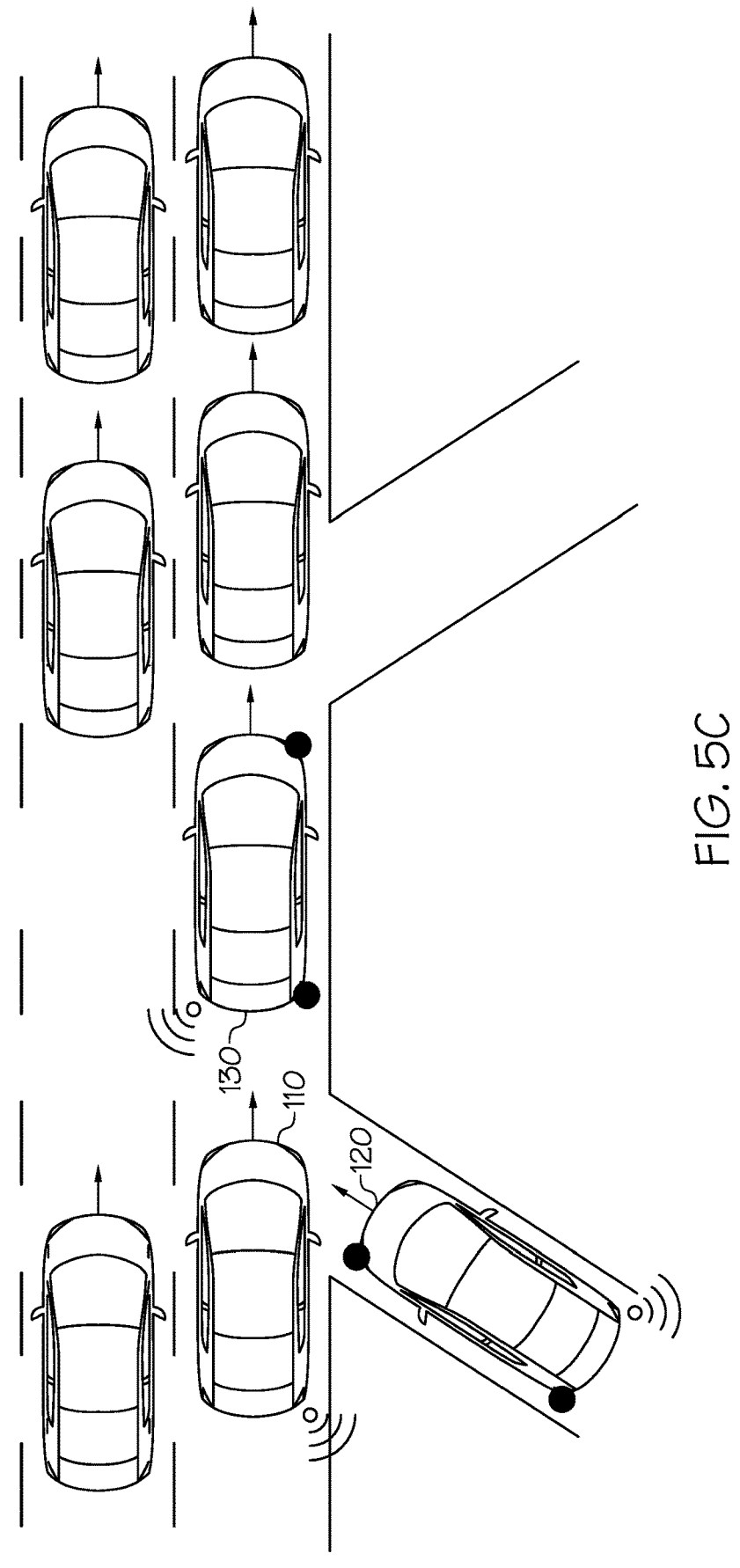

FIGS. 5A-5C schematically depict an exemplary embodiment of prioritizing a plurality of maneuver messages where the on-ramp and off-ramp are close to each other, according to one or more embodiments shown and described herein Referring to FIGS. 5A-5C, the ego vehicle 110, the first connected vehicle 120, and the second connected vehicle 130 may be on a highway where the on-ramp and off-ramp are close to each other. The ego vehicle 110 may be in the rightmost lane. The first connected vehicle 120 may be in on-ramp and slower than the ego vehicle 110. The second connected vehicle 130 may be in the left lane of the ego vehicle 110. The first connected vehicle 120 may want to merge onto the main road in front of the ego vehicle 110. The second connected vehicle 130 may want to change to the rightmost lane in front of the ego vehicle 110 to exit the highway.

The ego vehicle 110 may receive the first maneuver message MM1 from the first connected vehicle 120 and the second maneuver message MM2 from the second connected vehicle 130. The first maneuver message MM1 from the first connected vehicle 120 may include a first maneuver related to merging onto the main road in front of the ego vehicle 110. The second maneuver message MM2 from the second connected vehicle 130 may include a second maneuver related to the lane change from the current lane to the rightmost lane in front of the ego vehicle 110.

Still referring to FIGS. 5A-5C, after receiving the first maneuver message MM1 from the first connected vehicle 120 and the second maneuver message MM2 from the second connected vehicle 130, the ego vehicle 110 may evaluate criticality for the maneuvers. In FIGS. 5A and 5B, the ego vehicle 110 may not easily determine based on whether a maneuver is mandatory or discretionary. The ego vehicle 110 may determine priorities of the first maneuver message MM1 and the second maneuver message MM2 to maximize the sum of the benefit values of the ego vehicle 110, the first connected vehicle 120, the second connected vehicle 130, the unconnected vehicles, or combinations thereof. For example, the ego vehicle 110 may determine based on whether a conflict would occur, the severity of the potential conflict, the effect of the maneuver on the ego vehicle 110, the effect of the maneuver on the first connected vehicle 120, the effect of the maneuver on the second connected vehicle 130, the effect of the maneuver on traffic flow, or combinations thereof. For example, the first maneuver message MM1 shows that the first connected vehicle 120 is traveling slower on ramp and intended maneuver of first connected vehicle 120, merging in front of the ego vehicle 110. The ego vehicle 110 may determine that the first maneuver message MM1 requires the ego vehicle 110 to brake harshly, which may lead to a conflict and impact traffic behind. The second maneuver message MM2 shows that the second connected vehicle 130 is traveling faster in the inner lane. The ego vehicle 110 may determine that the second maneuver message MM2 does not require a harsh brake of the ego vehicle 110. The ego vehicle 110 may further determine that missing exit may cause a long detour for the second connected vehicle 130 while the first connected vehicle 120 may still merge on to the main road behind the ego vehicle 110.

Based on the degrees of criticality for the maneuvers, the ego vehicle 110 may determine the sum of benefit values of the ego vehicle 110, the first connected vehicle 120, the second connected vehicle 130, and unconnected vehicles, or combinations thereof, related to the first maneuver message MM1 is lower than the sum of benefit values of the ego vehicle 110, the first connected vehicle 120, the second connected vehicle 130, and unconnected vehicles, or combinations thereof, related to the second maneuver message MM2 from the second connected vehicle 130. The ego vehicle 110 may determine that the second maneuver message MM2 has higher priority than the first maneuver message MM1.

Still referring to FIGS. 5A-5C, due to the traffic scenario and the traffic density, the ego vehicle 110 may not accept all maneuver messages. For example, the ego vehicle 110 may accept the second maneuver message MM2 from the second connected vehicle 130 and reject the first maneuver message MM1 from the first connected vehicle 120. The acceptance message, the denial message, or both, may include maneuver information about a lane change of the second connected vehicle 130 from the current lane to the rightmost lane in front of the ego vehicle 110.

In some embodiments, the ego vehicle 110 may transmit an acceptance message to the second connected vehicle 130. The ego vehicle 110 may transmit a denial message to the first connected vehicle 120.

Referring to FIG. 5C, after the ego vehicle 110 accepts the second maneuver message MM2 from the second connected vehicle 130 and rejects the first maneuver message MM1 from the first connected vehicle 120, the ego vehicle 110 and the second connected vehicle 130 may perform a cooperative maneuver, such as a lane change of the second connected vehicle 130 to the rightmost lane in front of the ego vehicle 110. The first connected vehicle 120 may keep moving in the on ramp. In some embodiments, after the second connected vehicle 130 makes a lane change, the ego vehicle 110 and the first connected vehicle 120 may perform a cooperative maneuver, such as merging onto the main road in the rightmost lane behind the ego vehicle 110. The first connected vehicle 120 may merge onto the main road behind the ego vehicle 110 without impacting the traffic and conflict between vehicles.

FIGS. 6A-6D schematically depict an exemplary embodiment of prioritizing a plurality of maneuver messages where the on-ramp and off-ramp are close to each other, according to one or more embodiments shown and described herein Referring to FIGS. 6A-6D, the ego vehicle 110, the first connected vehicle 120, and the second connected vehicle 130 may be on a highway where the on-ramp and off-ramp are close to each other. The ego vehicle 110 may be in the rightmost lane. The first connected vehicle 120 may be in on-ramp. The first connected vehicle 120 may be traveling near the end of the ramp with about the same or similar speed as the ego vehicle 110. The second connected vehicle 130 may be in the left lane of the ego vehicle 110. The second connected vehicle 130 may be traveling ahead of the first connected vehicle 120. The first connected vehicle 120 may want to merge onto the main road in front of the ego vehicle 110. The second connected vehicle 130 may want to change to the rightmost lane to exit the highway in front of the ego vehicle 110.

The ego vehicle 110 may receive the first maneuver message MM1 from the first connected vehicle 120 and the second maneuver message MM2 from the second connected vehicle 130. The first maneuver message MM1 from the first connected vehicle 120 may include a first maneuver related to merging onto the main road in front of the ego vehicle 110. The second maneuver message MM2 from the second connected vehicle 130 may include a second maneuver related to the lane change from the current lane to the rightmost lane in front of the ego vehicle 110.

Still referring to FIGS. 6A-6D, after receiving the first maneuver message MM1 from the first connected vehicle 120 and the second maneuver message MM2 from the second connected vehicle 130, the ego vehicle 110 may evaluate criticality for the maneuvers. In FIGS. 6A and 6B, the ego vehicle 110 may not easily determine based on whether a maneuver is mandatory or discretionary. The ego vehicle 110 may determine the priorities of the first maneuver message MM1 and the second maneuver message MM2 to maximize the sum of the benefit values of the ego vehicle 110, the first connected vehicle 120, the second connected vehicle 130, the unconnected vehicles, or combinations thereof. For example, the ego vehicle 110 may determine based on whether a conflict would occur, the severity of the potential conflict, the effect of the maneuver on the ego vehicle 110, the effect of the maneuver on the first connected vehicle 120, the effect of the maneuver on the second connected vehicle 130, the effect of the maneuver on traffic flow, or combinations thereof. For example, the first maneuver message MM1 shows that the first connected vehicle 120 is traveling slower on ramp and the intended maneuver of the first connected vehicle 120, merging in front of the ego vehicle 110. The ego vehicle 110 may determine that the first maneuver message MM1 requires the ego vehicle 110 to brake slightly, which may not lead to a conflict and impact traffic behind. The second maneuver message MM2 shows that the second connected vehicle 130 is traveling faster in the inner lane. The ego vehicle 110 may determine that the second maneuver message MM2 requires the ego vehicle 110 to brake slightly, which may not lead to a conflict and impact traffic behind.

Based on the degrees of criticality for the maneuvers, the ego vehicle 110 may determine the sum of benefit values of the ego vehicle 110, the first connected vehicle 120, the second connected vehicle 130, and unconnected vehicles, or combinations thereof, related to the first maneuver message MM1 is lower than the sum of benefit values of the ego vehicle 110, the first connected vehicle 120, the second connected vehicle 130, and unconnected vehicles, or combinations thereof, related to the second maneuver message MM2 from the second connected vehicle 130. The ego vehicle 110 may determine that the second maneuver message MM2 has higher priority than the first maneuver message MM1.

Still referring to FIGS. 6A-6D, considering the traffic scenario and the traffic density, the ego vehicle 110 may accept both the first maneuver message MM1 from the first connected vehicle 120 and the second maneuver message MM2 from the second connected vehicle 130. The acceptance messages may include maneuver information about a lane change of the second connected vehicle 130 from the current lane to the rightmost lane in front of the ego vehicle 110 and then a merge of the first connected vehicle 120 onto the main road.

In some embodiments, the ego vehicle 110 may transmit an acceptance message to the first connected vehicle 120. The ego vehicle 110 may transmit an acceptance message to the second connected vehicle 130. The acceptance message, the denial message, or both, may include maneuver information about a lane change of the second connected vehicle 130 from the current lane to the rightmost lane in front of the ego vehicle 110.

Figure 6C:
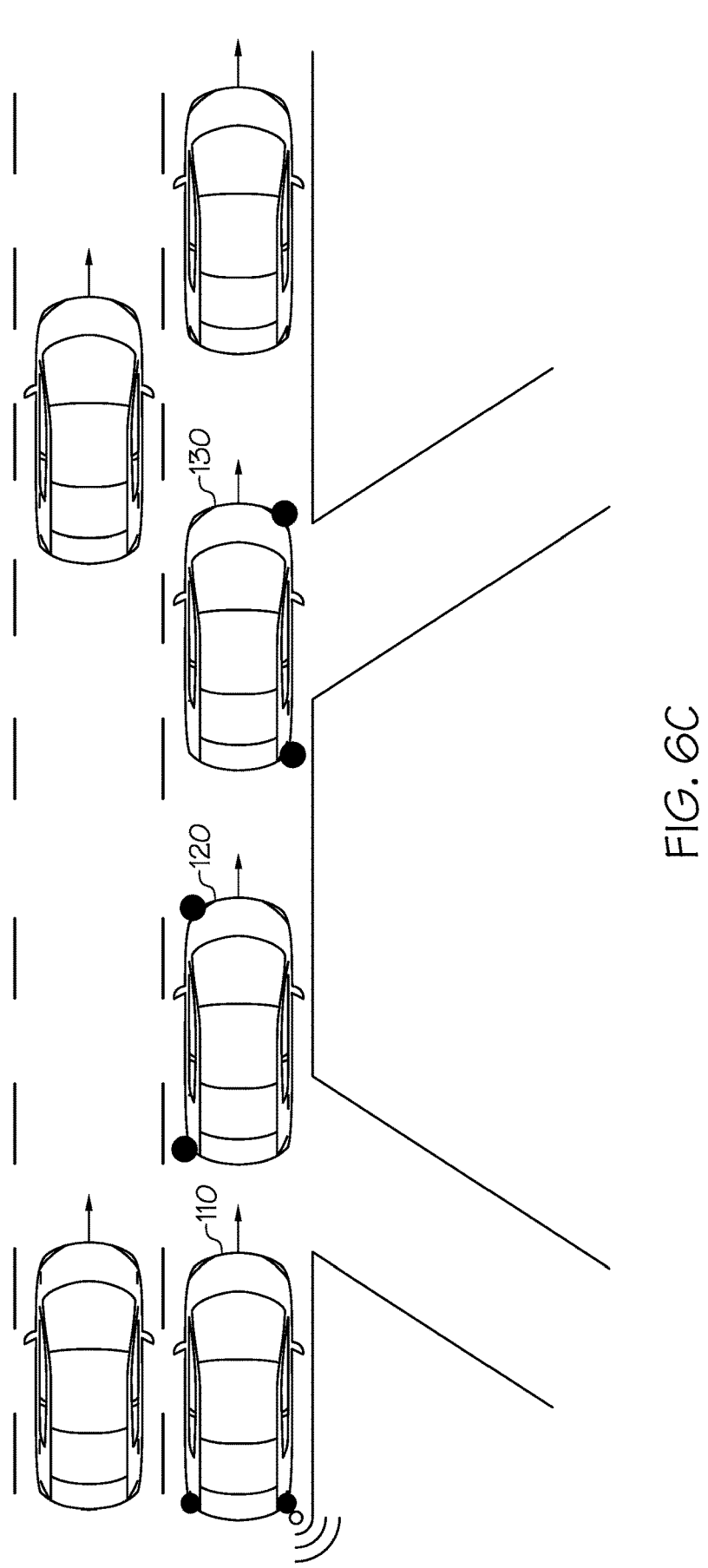

Referring to FIGS. 6C and 6D, in some embodiments, after the ego vehicle 110 accepts both the first maneuver message MM1 from the first connected vehicle 120 and the second maneuver message MM2 from the second connected vehicle 130, the first maneuver message MM1 and the second maneuver message MM2 may be combined into one cooperative maneuver. After the ego vehicle 110 accepts both the first maneuver message MM1 from the first connected vehicle 120 and the second maneuver message MM2 from the second connected vehicle 130, the ego vehicle 110, the first connected vehicle 120, and the second connected vehicle 130 may perform a cooperative maneuver, such as the ego vehicle 110 slightly brakes to let the first connected vehicle 120 merge onto the main road, and in the meantime, let the second connected vehicle 130 change lanes. This cooperative maneuver may allow the second connected vehicle 130 successfully exits the highway and the first connected vehicle 120 to merge onto the main road in front of the ego vehicle 110 and behind the second connected vehicle 130 without impacting the traffic and conflict between vehicles. In some embodiments, the speeds of the first connected vehicle 120 and the second connected vehicle 130 may be regulated to prevent conflict between the first connected vehicle 120 and the second connected vehicle 130.

FIGS. 7A-7D schematically depict an exemplary embodiment of prioritizing a plurality of maneuver messages including lane exchanges on a three-lane highway, according to one or more embodiments shown and described herein.

Referring to FIGS. 7A-7D, the ego vehicle 110, the first connected vehicle 120, and the second connected vehicle 130 may be on a three-lane highway. The ego vehicle 110 may be in the middle lane of the three-lane highway. The first connected vehicle 120 may be in the right lane of the three-lane highway. The second connected vehicle 130 may be in the left lane of the three-lane highway.

The ego vehicle 110 may be traveling in the middle lane. The first connected vehicle 120 may be traveling in the rightmost lane and want to make a lane change from the left lane to the middle lane using the gap formed by the ego vehicle 110 and the vehicle 140 in front of the ego vehicle 110. The second connected vehicle 130 may also want to make a lane change from the right lane to the middle lane using the gap formed by the ego vehicle 110 and the vehicle 140 in front of the ego vehicle 110.

The ego vehicle 110 may receive the first maneuver message MM1 from the first connected vehicle 120 and the second maneuver message MM2 from the second connected vehicle 130. The first maneuver message MM1 from the first connected vehicle 120 may include a first maneuver related to the lane change from the right lane to the middle lane in front of the ego vehicle 110. The second maneuver message MM2 from the second connected vehicle 130 may include a second maneuver related to the lane change from the left lane to the middle lane in front of the ego vehicle 110.

Still referring to FIGS. 7A and 7B, after receiving the first maneuver message MM1 from the first connected vehicle 120 and the second maneuver message MM2 from the second connected vehicle 130, the ego vehicle 110 may evaluate criticality for the maneuvers. In some embodiments, the degrees of criticality for the maneuvers include degrees of conflict caused by the maneuvers to be performed by the plurality of connected vehicles. The first maneuver may include a lane change from the right lane to the middle lane using the gap formed by the ego vehicle 110 and the vehicle 140 in front of the ego vehicle 110. The second maneuver may include a lane change from the left lane to the middle lane using the gap formed by the ego vehicle 110 and the vehicle 140 in front of the ego vehicle 110.

Referring to FIGS. 7A, 7B, and 8, in some embodiments, the ego vehicle 110 may determine each of the degrees of conflict based on the position of the corresponding connected vehicle in a conflict chart. When the first maneuver includes a lane change from the right lane to the middle lane using the gap formed by the ego vehicle 110 and the vehicle 140 in front of the ego vehicle 110, the ego vehicle 110 may determine that the position of the first connected vehicle 120 is positioned in the uncertain domain of the conflict chart. When the second maneuver includes a lane change from the left lane to the middle lane using the gap formed by the ego vehicle 110 and the vehicle 140 in front of the ego vehicle 110, the ego vehicle 110 may determine that the position of the second connected vehicle 130 is positioned in the uncertain domain of the conflict chart.

In response to determining that the positions of the first connected vehicle 120 and the second connected vehicle 130 are in the uncertain domain, the ego vehicle 110 may determine the priorities of the first maneuver message MM1 from the first connected vehicle 120 and the second maneuver message MM2 from the second connected vehicle 130 based on comparison of the shortest distance between the position of the first connected vehicle 120 in the conflict chart and the no conflict domain and the shortest distance between the position of the second connected vehicle 130 in the conflict chart and the no conflict domain. For example, when the shortest distance between the position of the first connected vehicle 120 in the conflict chart and the no conflict domain is longer than the shortest distance between the position of the second connected vehicle 130 in the conflict chart and the no conflict domain, the ego vehicle 110 may determine that the second maneuver message MM2 has higher priority than the first maneuver message MM1.

In some embodiments, when the ego vehicle 110 determines that the position of the first connected vehicle 120 is in the no conflict domain and the position of the second connected vehicle 130 is in the uncertain domain or the conflict domain (not shown), the ego vehicle 110 may determine that the first maneuver message MM1 from the first connected vehicle 120 has higher priority than the second maneuver message MM2 from the second connected vehicle 130. When the degree of conflict is positioned in the no conflict domain, the degree of conflict related to the maneuver message may have a larger opportunity to be accepted by the ego vehicle 110. When the degree of conflict is positioned in the uncertain domain, the conflict domain, or both, the degree of conflict related to the maneuver message may have a larger opportunity to be rejected by the ego vehicle 110 compared to the degree of conflict positioned on the no conflict domain.

Referring to FIGS. 7A and 7B, due to the traffic scenario and the traffic density, the ego vehicle 110 may not accept all maneuver messages. For example, the ego vehicle 110 may accept the second maneuver message MM2 from the second connected vehicle 130 and reject the first maneuver message MM1 from the first connected vehicle 120. The acceptance message, the denial message, or both, may include maneuver information about a lane change of the second connected vehicle 130 from the left lane to the middle lane in front of the ego vehicle 110.

In some embodiments, the ego vehicle 110 may transmit an acceptance message to the second connected vehicle 130. The ego vehicle 110 may transmit a denial message to the first connected vehicle 120.

Figure 7C:
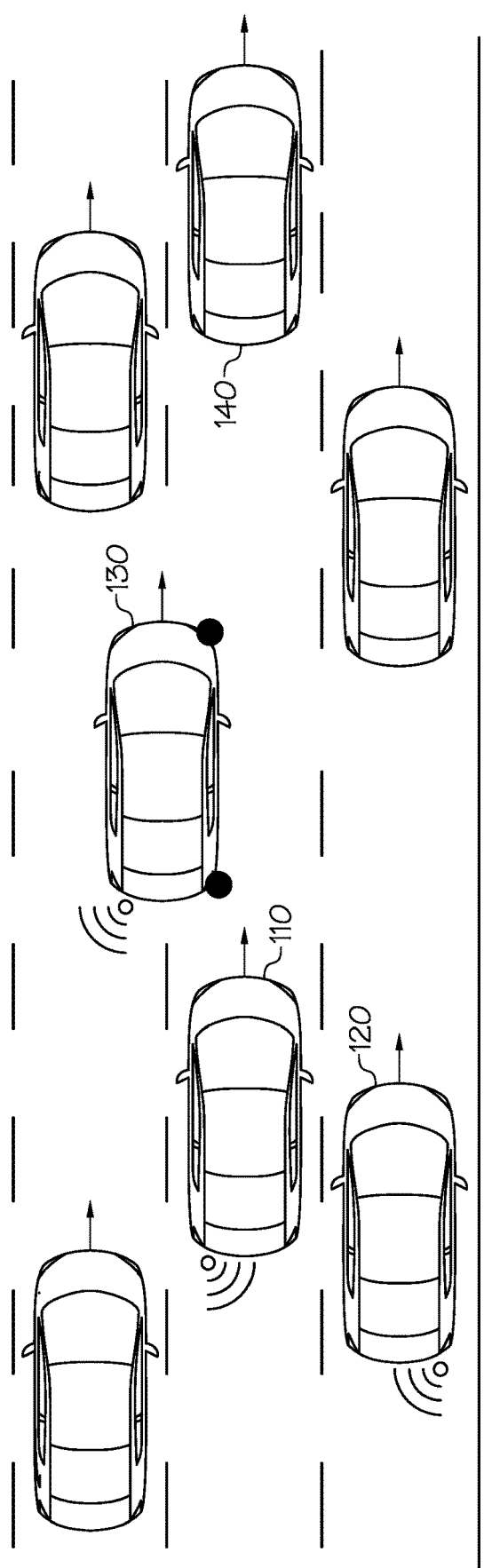
Figure 7D:
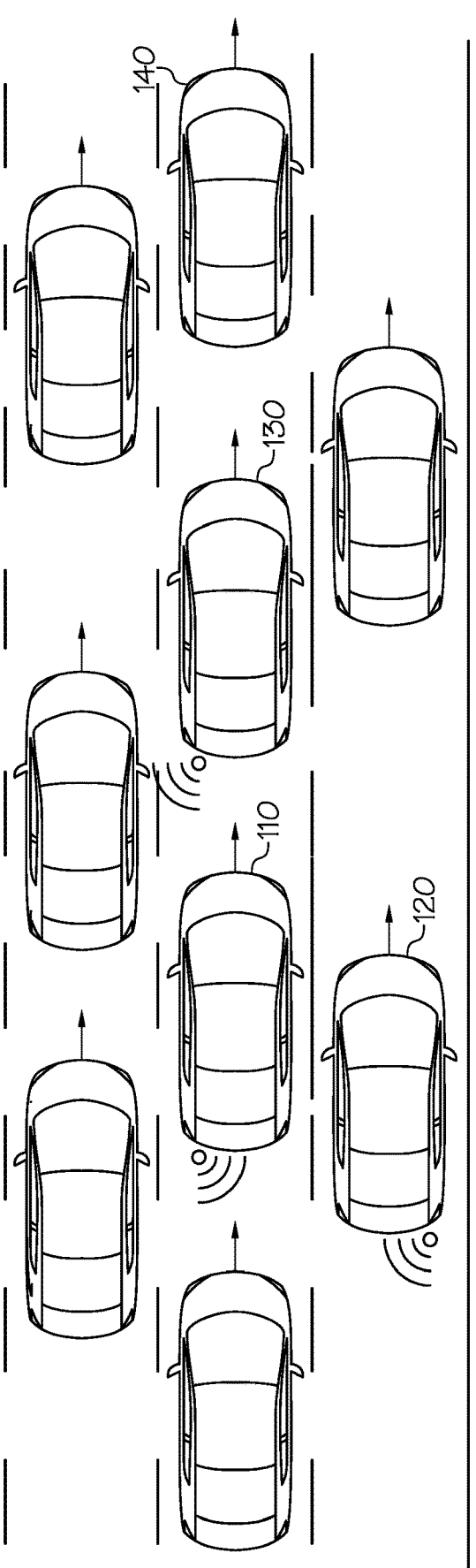

Referring to FIGS. 7C and 7D, after the ego vehicle 110 accepts the second maneuver message MM2 from the second connected vehicle 130 and rejects the first maneuver message MM1 from the first connected vehicle 120, the ego vehicle 110 and the second connected vehicle 130 may perform a cooperative maneuver, such as a lane change of the second connected vehicle 130 from the left lane to the middle lane in front of the ego vehicle 110. The first connected vehicle 120 may keep moving in the right lane without a lane change. In some embodiments, after the second connected vehicle makes a lane change, the ego vehicle 110 and the first connected vehicle 120 may perform a cooperative maneuver, such as a lane change of the first connected vehicle 120 from the right lane to the middle lane.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. An ego vehicle comprising:

a controller configured to:

receive a plurality of maneuver messages transmitted from a plurality of connected vehicles to the ego vehicle, the maneuver messages including maneuvers to be performed by the plurality of connected vehicles;

determine degrees of criticality for the maneuvers, wherein the degrees of criticality include degrees of conflict caused by the maneuvers, and the degrees of conflict are charted by the controller on a conflict chart which comprises a Cartesian chart having a no-conflict domain, an uncertain domain, and a conflict domain, each of which is plotted against a front gap between the ego vehicle and a first connected vehicle on a first axis and against a rear gap between the ego vehicle and a second connected vehicle on a second axis;

determine priorities of the plurality of maneuver messages based on a relative positioning of the degrees of conflict of the maneuvers on the conflict chart;

determine whether to accept one or more of the plurality of maneuver messages based on the determined priorities; and control the ego vehicle to perform a cooperative maneuver upon accepting the one or more of the plurality of maneuver messages.

2. The ego vehicle according to claim 1, wherein in response to determining that a position of a first connected vehicle is in the no-conflict domain and a position of a second connected vehicle is in the uncertain domain or the conflict domain, the controller is configured to determine that a maneuver message from the first connected vehicle has higher priority than a maneuver message from the second connected vehicle.

3. The ego vehicle according to claim 1, wherein in response to determining that a position of a first connected vehicle and a position of a second connected vehicle are in the uncertain domain, the controller is configured to determine the priorities of a maneuver message from the first connected vehicle and a maneuver message from the second connected vehicle based on a shortest distance between the position of the first connected vehicle in the conflict chart and the no-conflict domain and a shortest distance between the position of the second connected vehicle in the conflict chart and the no-conflict domain.

4. The ego vehicle according to claim 1, wherein the degrees of criticality for the maneuvers further include a plurality of benefit values related to performing the maneuvers.

5. The ego vehicle according to claim 4, wherein the controller is configured to determine the priorities of the plurality of maneuver messages to maximize sum of the benefit values of the ego vehicle, the plurality of connected vehicles, unconnected vehicles, or combinations thereof.

6. The ego vehicle according to claim 4, wherein the benefit values include comfort aspects, time efficiency aspects, energy efficiency, or combinations thereof.

7. The ego vehicle according to claim 1, wherein the controller is configured to:

set a predetermined time period of receiving maneuver messages; and stop receiving additional maneuver messages or shorten the predetermined time period of receiving maneuver messages in response to receiving an emergency maneuver message from one of the plurality of maneuver messages during the predetermined time period.

8. The ego vehicle according to claim 7, wherein the controller is configured to extend the predetermined time period for receiving maneuver messages in response to determining that no emergency maneuver message is received during the predetermined time period.

9. The ego vehicle according to claim 1, wherein the plurality of maneuver messages comprise a mandatory maneuver message and a discretionary maneuver message, and wherein the mandatory maneuver message has higher priority than the discretionary maneuver message.

10. The ego vehicle according to claim 1, the controller is further configured to transmit acceptance messages, denial messages, or both to the plurality of connected vehicles.

11. The ego vehicle according to claim 10, wherein the acceptance messages, the denial messages, or both include maneuver information about the maneuvers to be performed by one or more of the plurality of connected vehicles.

12. The ego vehicle according to claim 1, wherein the plurality of maneuver messages comprises a first message from the first connected vehicle and a second message from the second connected vehicle, and the cooperative maneuver is performed upon accepting both the first and second messages.

13. A method for prioritizing a plurality of maneuver messages, the method comprising:

receiving at an ego vehicle the plurality of maneuver messages transmitted from a plurality of connected vehicles, wherein the maneuver messages include maneuvers to be performed by the plurality of connected vehicles;

determining, by a controller, degrees of criticality for the maneuvers, wherein the degrees of criticality include degrees of conflict caused by the maneuvers, and the degrees of conflict are charted by the controller on a conflict chart which comprises Cartesian chart having a no-conflict domain, an uncertain domain, and a conflict domain, each of which is plotted against a front gap between the ego vehicle and a first connected vehicle on a first axis and against a rear gap between the ego vehicle and a second connected vehicle on a second axis;

determining priorities of the plurality of maneuver messages based on a relative positioning of the degrees of conflict of the maneuvers on the conflict chart;

determining whether to accept one or more of the plurality of maneuver messages based on the determined priorities; and controlling, by the controller, the ego vehicle to perform a cooperative maneuver upon accepting the one or more of the plurality of maneuver messages.

14. The method according to claim 13, further comprising:

in response to determining that the position of a first connected vehicle is in the no-conflict domain and the position of a second connected vehicle is in the uncertain domain or the conflict domain, determining that a maneuver message from the first connected vehicle has higher priority than a maneuver message from the second connected vehicle.

15. The method according to claim 13, wherein the degrees of criticality for the maneuvers further include a plurality of benefit values related to performing the maneuvers.

16. The method according to claim 13, wherein the plurality of maneuver messages comprise a mandatory maneuver message and a discretionary maneuver message, and wherein the mandatory maneuver message has higher priority than the discretionary maneuver message.

17. The method according to claim 13, wherein the plurality of maneuver messages comprises a first message from the first connected vehicle and a second message from the second connected vehicle, and the cooperative maneuver is performed upon accepting both the first and second messages.

18. A non-transitory computer-readable medium containing instructions that, when executed by a controller, causes the controller to:

receive at an ego vehicle a plurality of maneuver messages transmitted from a plurality of connected vehicles, wherein the maneuver messages include maneuvers to be performed by the plurality of connected vehicles;

determine degrees of criticality for the maneuvers, wherein the degrees of criticality include degrees of conflict caused by the maneuvers, and the degrees of conflict are charted by the controller on a conflict chart which comprises Cartesian chart having a no-conflict domain, an uncertain domain, and a conflict domain, each of which is plotted against a front gap between the ego vehicle and a first connected vehicle on a first axis and against a rear gap between the ego vehicle and a second connected vehicle on a second axis;

determine priorities of the plurality of maneuver messages based on a relative positioning of the degrees of conflict of the maneuvers on the conflict chart;

determine whether to accept one or more of the plurality of maneuver messages based on the determined priorities; and control the ego vehicle to perform a cooperative maneuver upon accepting the one or more of the plurality of maneuver messages.

19. The non-transitory computer-readable medium according to claim 18, wherein the plurality of maneuver messages comprises a first message from the first connected vehicle and a second message from the second connected vehicle, and the cooperative maneuver is performed upon accepting both the first and second messages.

* * * * *